US011210733B2

(12) United States Patent
Wright-Freeman

(10) Patent No.: US 11,210,733 B2
(45) Date of Patent: *Dec. 28, 2021

(54) SYSTEM, DEVICE AND METHOD FOR DETECTING AND MONITORING A BIOLOGICAL STRESS RESPONSE FOR MITIGATING COGNITIVE DISSONANCE

(71) Applicant: Kayla Wright-Freeman, Inglewood, CA (US)

(72) Inventor: Kayla Wright-Freeman, Inglewood, CA (US)

(*) Notice: Subject to any disclaimer, the term of this patent is extended or adjusted under 35 U.S.C. 154(b) by 23 days.

This patent is subject to a terminal disclaimer.

(21) Appl. No.: 16/884,023

(22) Filed: May 26, 2020

(65) Prior Publication Data

US 2020/0364779 A1 Nov. 19, 2020

Related U.S. Application Data

(63) Continuation-in-part of application No. 16/158,270, filed on Oct. 11, 2018, now Pat. No. 10,664,904, which is a continuation-in-part of application No. 14/159,312, filed on Jan. 20, 2014, now abandoned, which is a continuation of application No. 12/219,386, filed on Jul. 21, 2008, now Pat. No. 8,635,101.

(Continued)

(51) Int. Cl.
*G06Q 40/00* (2012.01)
*G06Q 40/06* (2012.01)

(52) U.S. Cl.
CPC ............ *G06Q 40/00* (2013.01); *G06Q 40/06* (2013.01)

(58) Field of Classification Search
None
See application file for complete search history.

(56) References Cited

U.S. PATENT DOCUMENTS 7,356,497 B1 4/2008 Bursey et al.
7,904,362 B1 3/2011 Smith
(Continued)

OTHER PUBLICATIONS

The Bible, American Standard Version, Updated English language version, in html format. The Book of Luke . . . www.awitness.org/biblehtm/lu/lu16.htm, 1995.

*Primary Examiner* — Narayanswamy Subramanian
(74) *Attorney, Agent, or Firm* — Doster Greene, LLC

(57) ABSTRACT

A wearable biometric device to mitigate cognitive dissonance according to various embodiments can be configured to define one or more geo-fences relative to one or more physical locations; detect a geo-fence crossing when the wearable biometric device crosses any of the geo-fences; activate a geo-fence application and a biometric application, in response to the detection of a geofence crossing; monitor behavior transactions of the user while the wearable biometric device is located within the geo-fence; activate a biometric sensor to detect biometric conditions of the user and determine if the biometric conditions of the user exceeds a predetermined threshold; activate a stimuli generating unit to detect if the user experiences a biometric stressor while the wearable biometric device is located within the geo-fence and activate the stimuli generating unit to apply one or more stimuli to the user until the biometric stressor experienced by the user is below the threshold.

21 Claims, 14 Drawing Sheets

Related U.S. Application Data

(60) Provisional application No. 60/935,002, filed on Jul. 20, 2007.

(56) References Cited

U.S. PATENT DOCUMENTS

| | | |
|---|---|---|
| 8,635,101 B2 | 1/2014 | Wright |
| 10,664,904 B2 | 5/2020 | Wright |
| 2002/0156710 A1 | 10/2002 | Ryder |
| 2004/0054610 A1 | 3/2004 | Amstutz et al. |
| 2004/0068429 A1 | 4/2004 | MacDonald |
| 2004/0254835 A1 | 12/2004 | Thomas |
| 2005/0267836 A1 | 12/2005 | Crosthwaite et al. |
| 2006/0218068 A1 | 9/2006 | Loeper |
| 2007/0244777 A1 | 10/2007 | Torre |
| 2008/0147567 A1 | 6/2008 | Perry |
| 2009/0106136 A1 | 4/2009 | Wright |
| 2012/0316406 A1* | 12/2012 | Rahman ............... A61B 5/0024 600/301 |
| 2014/0136383 A1 | 5/2014 | Wright |
| 2017/0035367 A1* | 2/2017 | Reich .................... A61B 5/746 |
| 2021/0052221 A1* | 2/2021 | Selvam ................. A61B 5/681 |

* cited by examiner

SYSTEM, DEVICE AND METHOD FOR DETECTING AND MONITORING A BIOLOGICAL STRESS RESPONSE FOR MITIGATING COGNITIVE DISSONANCE

CROSS-REFERENCE TO RELATED APPLICATION

This application is a continuation-in-part of U.S. patent application Ser. No. 16/158,270, filed Oct. 11, 2018, now U.S. Pat. No. 10,664,904, which is a continuation-in-part of U.S. patent application Ser. No. 14/159,312, filed Jan. 20, 2014, now abandoned, which is a continuation of U.S. patent application Ser. No. 12/219,386, filed Jul. 21, 2008, now U.S. Pat. No. 8,635,101, issued on Jan. 21, 2014, which claims benefit of U.S. Provisional Patent Application No. 60/935,002, filed on Jul. 20, 2007. The subject matter of the earlier filed application is hereby incorporated by reference.

FIELD OF THE INVENTION

The present teachings relate to a wearable biometric device and, more particularly, to methods and systems for monitoring and capturing biological data indicative of a user's cognitive dissonance and based on location determined by geo-fencing.

BACKGROUND OF THE INVENTION

The scientific fields of psychology and neuroscience provide evidence of detectable biological responses of cognitive dissonance. Typically, people aim for consistency between their attitudes and behaviors that they participate in and may use rational methods to achieve this consistency. A person seeks to keep their life expectations and their reality aligned.

However, cognitive dissonance refers to a situation involving conflicting attitudes, beliefs or behaviors. These conflicts can produce biological stress, such as psychological stress or mental discomfort, to manifest within a person. To mitigate the stress of cognitive dissonance, oftentimes a person will change at least one attitude, belief or behavior, instead of maintaining the consistency between their attitudes, beliefs and behaviors. In order to alleviate the resulting discomfort, one is driven to change either their cognition or their behavior. Namely, when a person engages in a particular behavior and is experiencing cognitive dissonance, it can alter the course of a person's life due to the stress or mental discomfort.

Cognitive dissonance may develop in a variety of situations. For example, cognitive dissonance may occur during forced compliance behavior, when an individual is forced to perform an action that is inconsistent with his or her beliefs. Another example of cognitive dissonance is decision making. Life is filled with decisions as a person engages in daily transactions. However, some decisions can lead to dissonance before, during, or after making a decision when choosing or the choice made between two or more alternatives generates a stressful response.

Stress is a body's method for reacting to a challenge. There are various biosignal processing technologies, including wearable sensors, that can be used for stress detection, such as respiration and skin temperature, blood pressure, blood volume pulses, electroencephalography (EEG), electrocardiography (ECG), electromyography (EMG), and galvanic skin resistance.

A person's stress level due to cognitive dissonance can also be impacted based on the user's location as a person visits different locations and engages in decision making. For example, when a person with an alcoholic addiction (behavior), who is attempting to recover and maintain sobriety, enters a facility such as a bar (location) that serves alcohol, and the person knows that engaging in the act of drinking can cause mental distress or harm (cognition), the person is in a state of cognitive dissonance. In such a situation, it may be desirable to detect a biological response by a wearable device if the person performs or engages in an action (i.e. drinking alcohol) that is inconsistent with his or her belief (refraining from drinking).

It may be desirable to provide a program and method that can detect the biological stresses that are attributable to cognitive dissonance. It may be further desirable to provide a stimulation to mitigate such detectable biological stresses.

It may also be desirable to provide devices and methods that applies a stimulatory effect to the user when stress is detected within a pre-defined geo-fence. The stimulatory effect can be applied to promote a change in the person's behavior and to mitigate an adverse decision-making process based on the user's specific life beliefs, values, and ideas. It may be desirable to provide devices and methods that establish a virtual perimeter (geo-fence) around a geographic location or route and enable a stimulatory effect to a user based on the user's stress level and location relative to the geographic location or route.

It may further be desirable to provide an apparatus and method that enables a user to develop life objectives and that performs a computational analysis to determine whether the user's decisions and behaviors are adverse to the user's beliefs, values, and ideas. It may be desirable to provide a program and method that, when implemented by the user or assisting psychotherapist or coach, serves to help improve life decisions and behaviors that ultimately bring the user's behaviors into alignment with their beliefs, values, and ideas.

SUMMARY OF THE INVENTION

The present invention may satisfy one or more of the above-mentioned desirable features. Other features and/or aspects may become apparent from the description which follows.

A wearable biometric device according to various exemplary embodiments can include a user interface, a location unit, a biometric sensor, a stimuli generating unit, a transceiver and a processor. The user interface having a display receives information from a user. The location unit detects location information of the wearable biometric device and communicates the location information to a location service and from the location service to the wearable biometric device. A memory is configured to store instructions executable by the processor. The processor is operatively coupled to the user interface, the location unit, the biometric sensor, the stimuli generating unit, the transceiver and the memory. The processor configured to: define one or more geo-fences having a virtual boundary relative to one or more respective physical locations; detect a geo-fence crossing when the wearable biometric device crosses any of the one or more geo-fences; activate a geo-fence application and a biometric application, in response to the detection of a geofence crossing; define, based on the physical location, at least one of a type of geo-fence event, a type of geo-fence transition, and a type of predefined geofence trigger event; receive behavior data of the user based on the at least one of the type of geo-fence event, the type of geo-fence transition, and the type of predefined geofence trigger event; monitor behavior transactions of the user while the wearable biometric device is located within the geo-fence; activate the biometric sensor to detect one or more biometric conditions of the user and determine if the one or more biometric conditions of the user exceeds a predetermined threshold while the wearable biometric device is located within the geo-fence; activate the stimuli generating unit to detect if the user experiences a biometric stressor due to the one or more biometric conditions of the user exceeding the predetermined threshold while the wearable biometric device is located within the geo-fence and activate the stimuli generating unit to apply one or more stimuli to the user until the biometric stressor experienced by the user is below the predetermined threshold; and deactivate the one or more geo-fences relative to the one or more physical locations when the wearable biometric device exits the one or more geo-fences.

A method performed by a wearable biometric device that is a mobile device comprising a processor and a non-transitory computer-readable storage medium storing instructions that, when executed, cause the mobile device to perform the method according to various exemplary embodiments can include defining one or more geo-fences having a virtual boundary relative to one or more respective physical locations; detecting a geo-fence crossing when the wearable biometric device crosses any of the one or more geo-fences; activating a geo-fence application and a biometric application, in response to the detection of a geofence crossing; defining, based on the physical location, at least one of a type of geo-fence event, a type of geo-fence transition, and a type of predefined geofence trigger event; receiving financial data of a user based on the at least one of the type of geo-fence event, the type of geo-fence transition, and the type of predefined geofence trigger event; monitoring financial transactions of the user while the wearable biometric device is located within the geo-fence; activating a biometric sensor included within the wearable biometric device to detect one or more biometric conditions of the user and determine if the one or more biometric conditions of the user exceeds a predetermined threshold while the wearable biometric device is located within the geo-fence; activating the stimuli generating unit included within the wearable biometric device to detect if the user experiences a biometric stressor due to the one or more biometric conditions of the user exceeding the predetermined threshold while the wearable biometric device is located within the geo-fence and activating the stimuli generating unit to apply one or more stimuli to the user until the biometric stressor experienced by the user is below the predetermined threshold; and deactivating the one or more geo-fences relative to the one or more physical locations when the wearable biometric device exits the one or more geo-fences.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

DESCRIPTION OF THE EMBODIMENTS

Figure 1:
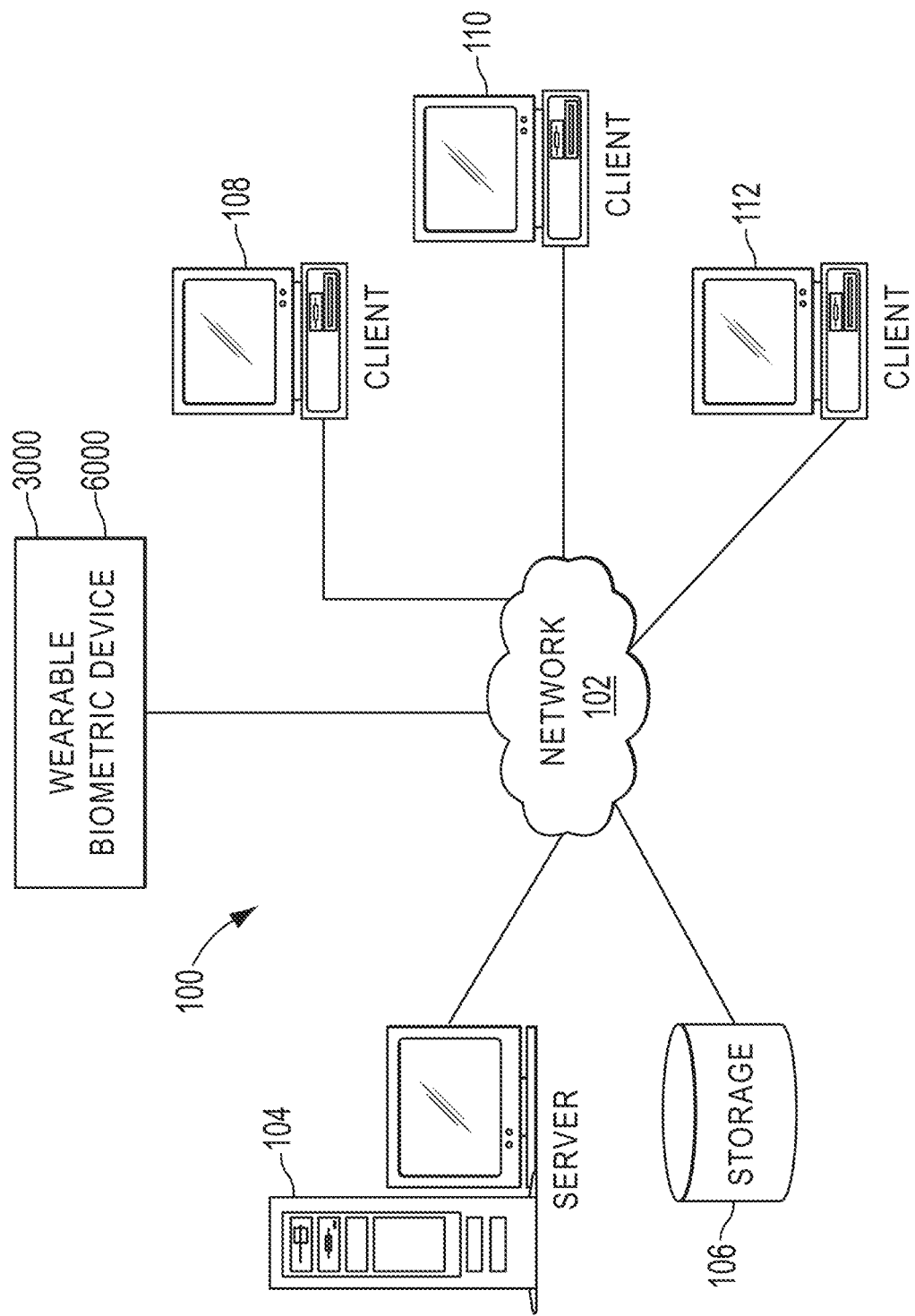
FIG. 1 depicts a representation of a network of data processing systems which employs a cognitive dissonance mitigation rules database in accordance with the present teachings.

Reference will now be made to various embodiments, examples of which are illustrated in the accompanying drawings. However, these various exemplary embodiments are not intended to limit the disclosure. On the contrary, the disclosure is intended to cover alternatives, modifications, and equivalents.

Throughout the application, description of various embodiments may use "comprising" language, however, it will be understood by one of skill in the art, that in some specific instances, an embodiment can alternatively be described using the language "consisting essentially of" or "consisting of."

For purposes of better understanding the present teachings and in no way limiting the scope of the teachings, it will be clear to one of skill in the art that the use of the singular includes the plural unless specifically stated otherwise.

Therefore, the terms "a", "an", and "at least one" are used interchangeably in this application. As used herein, the term "about" or "approximately" means that the parameter recited or value can vary between about +/−20%. All embodiments of any aspect of the invention can be used in combination, unless the context clearly dictates otherwise.

Various embodiments provide an apparatus and method that instantaneously and dynamically during a decision-making transaction detects a user's propensity to engage in emotion driven behavior based on the user's biological data. Various embodiments provide an apparatus and method that performs a comparative analysis that ensures that the user's decision making or behavior is consistent with the user's values, vision, goals, priorities, goals and planned intentions.

A cognitive dissonance mitigation rules database can be incorporated into one or more components or devices of the system to enable the user to conduct a self-guided cognitive dissonance mitigation session or a professional therapy session with, for example, a psychotherapist, a psychologist, a psychiatrist, a psychoanalyst, a life coach, a counselor, and a social worker, to guide the user through the session. In various embodiments, an apparatus and method are provided that enables a user to identify their dominant life values, priorities and goals to facilitate values-based behavioral planning and behavioral coaching. Studies show that in order to avoid cognitive dissonance and regrettable actions, a user's most satisfying decisions should be values centered. Various embodiments provide an apparatus and method that performs a computational analysis to determine whether a user's decision making or behavior while conducting a transaction is adverse to the user's life values. If the decision made or behavior is adverse due to cognitive dissonance, the devices and methods provide a stimulatory effect to the user to mitigate the adverse decisions, behavior, or transaction. The application of the stimulatory effect can further facilitate a future modification in behaviors and decisions based on the user's specific life priorities.

One example of a mechanism that may be employed in the cognitive dissonance mitigation rules database to gather and compile preliminary information is a values assessment. The values assessment can aid the user in clarifying their primary life concerns and core values. Such a model can then be used to generate a life values profile that serves to guide their major life decisions and determines the appropriate allocation of resources. This model will serve to facilitate comparative analysis between the user's behaviors and defined values to determine whether they are in alignment.

In various embodiments, an apparatus and method are provided that enables a user to develop goals to define preferred behaviors or priorities and to facilitate planning to implement such preferred behaviors or priorities. Various embodiments provide an apparatus and method that performs a computational analysis to determine whether the user's decision, behavior or transaction is adverse to the user's preferred behavior planning goals. If the decision, behavior or transaction is adverse, the devices and methods provide a stimulatory effect to the user to mitigate the adverse decision, behavior, or transaction based on the user's specific priorities.

Various embodiment of the method and apparatus described herein provide a monitoring device to provide stimuli to the user. Many types of stimuli may be used and are contemplated herein. For example, the stimuli may be auditory, tactile (touch), vibratory, pressure, temperature (warm, cold, neutral), visual stimuli including images and video, or any combination thereof.

For example, some of such types of stimuli are described in further detail below. A speech stimulus may include certain words, sentences, content or affect, presented using sound or visually. A tactile stimulus may include pressure level for a constant stimulus, frequency for a vibratory stimulus, temperature. Visual stimuli may be based on color, pattern, image content, video content, motion content, direction, orientation, size or other features. The preferred embodiment is directed towards a tactile stimulus that is applied directly to the user's skin.

In various embodiments, different stimuli may be selected, the intensity adjusted, and applied to user. These stimuli may be combined or applied individually according to a predetermined order. In some embodiments, the stimuli may be applied to a plurality of different body parts of the user.

A variety of types of devices may be used, individually or in combination, for applying, presenting, and monitoring stimuli. For example, stimuli may be applied or presented to the user using a wearable device, watch, computer, telephone, cell phone, smart phone, headphones, ear buds, tablet computer, PDA, Internet browser, Web application, mobile application, social network, virtual reality googles, thermal probe, pneumatic pressure probe, mechanical pressure probe and smart clothing that includes biometric sensors. Future models may incorporate implantable sensors that are inserted under the user's skin. The data representing such stimuli may be stored either directly on the delivery/presentation device(s) itself (e.g., in non-transitory computer-readable media incident to, collocated or otherwise incident to the delivery/presentation device). In some embodiments, the data representing the stimuli is stored or represented remotely from the delivery/presentation device(s), e.g., in a data store of a computing resource provider. In such embodiments, devices may connect to (and retrieve the stimuli and associated data from) the entity storing the stimuli and associated data via any appropriate direct or programmatic interface. Examples include APIs, Wi-Fi, Bluetooth, cellular protocols (such as LTE, HSPA, GSM, CDMA, WiMAX and the like), Web services (including those using representation state transfer (REST) and/or Simple Object Access Protocol (SOAP)), Web interfaces (programmatic and otherwise), network protocols such as TCP/IP, and the like. stimuli may be stored in any appropriate format, including audio file formats such as MP3, MP4, AAC, video file formats such as MPEG, and others.

During a decision, behavior, or transaction, the device can be configured to instantaneously and dynamically detect the emotional response based on the user's biological data and, in comparison to the user's preferred behaviors and priorities defined in the cognitive dissonance mitigation rules database. If the device determines that the decision, behavior or financial transaction is adverse to the user's defined preferred behaviors or priorities, the device is configured to provide a stimulatory effect to the user to mitigate the adverse decision based on the user's specific preferred behaviors or priorities.

The device can be configured to detect the emotional distress experienced by a user due to cognitive dissonance by monitoring various body conditions of the user. The device may include a biometric sensor that is capable of measuring one or more body conditions, such as heart rate, perspiration level, and body temperature. In one embodiment, the device is a wrist band worn around the wrist of the user. In another embodiment, the device is a piece of smart clothing having one or more biometric sensors embedded therein. The biometric sensor can measure breathing, heart rate, and muscle tension to determine a number of health metrics, like stress level, anxiety, etc. When the user is stressed out, his breathing becomes shallow, his heart rate increases, and his body tenses up. The device can recognize all these physical changes in the user's body and alert the user of these conditions. The emotional distress of the user can be estimated from the perspiration level, body temperature, heart rate, and a combination thereof. If the device determines that the level of emotional distress exceeds a predetermined level, the stimulus generator unit of the device generates and applies a stimulus to the user. The stimulus generator is configured to generate a stimulus under the control of a controller.

After collection of the biometric signals or biosignal data, the system and method calculate stress indices value of cognitive data and physical data. The stress indices value is calculated to establish the user's stress level. The system and method can employ biosignal processing technologies, such as medical monitoring devices, including wearable devices, to detect human stress. There are various biosignal processing technologies used for stress detection, for example, such as respiration and skin temperature, blood pressure, blood volume pulses, electroencephalography (EEG), electrocardiography (ECG), electromyography (EMG), and galvanic skin resistance.

In various embodiments, the device may include a locating device that is capable of providing a signal that indicates the device's location. The locating device may include a Global Positioning System (GPS) device configured to generate a location signal indicative of a location of the device or any other known locating device that receives or determines positional information associated with the device. In addition to the GPS device, the device may include a motion sensor that is configured to detect one or more changes in position, velocity, acceleration, or orientation of the device. A controller may be provided in communication with the GPS device and the motion sensor. For example, the GPS device, the motion sensor, or a combination thereof can be used to track the location of the device. Based on the location signal received from the GPS device and/or the motion sensor, the controller can determine when the user enters a predefined geographic location while wearing the device. The system and method can establish a virtual perimeter (geo-fence) around a predefined geographic location or route and enable an alert and/or apply a stimulatory effect to a user based on the user's stress level and location relative to the geographic location or route. The controller determines that the user while wearing the device enters a predefined geographic location, the controller activates a biometric sensor to begin obtaining biometric data from the user. When the biometric data exceeds a predetermined level, the controller instructs the stimuli device to apply a stimulus to the user for a predetermined amount of time or until the biometric data falls below the predetermined level.

In various embodiments, the device can be used to detect stress while the users initially establish the user's cognitive dissonance mitigation rules database to develop their goals and priorities during a behavioral planning session. If the device detects that the user's stress level exceeds a predetermined level, the device can apply one or more stimuli to the user to alert the user and reduce the user's stress level.

In addition, the device can be employed, during a behavioral analysis review, as users review their behavioral patterns to determine whether their past decisions, behavior, or transactions have been made in alignment with the user's goals and plans. The device can be worn at the time the users review their actual behavioral patterns to detect, for example, heart rate as well as the presence of perspiration. Because these two exemplary biological parameters are natural responses to the stress the users may experience when reviewing their past behavior or progress toward a specific goal. Past behaviors cannot be changed, since they have already occurred in the past, so the user's dissonance will need to be reduced by re-evaluating their attitude to what they have done. The device will detect distress in the users and determine whether or not they are satisfied with the consequences of their decisions or behavioral patterns based on the goals they have established according to their behavior planning and/or cognitive dissonance mitigation rules database.

In various embodiments, the device's computational analysis may reveal problematic habits or nonoptimal behaviors that are preventing the user from achieving his or her personal goals. For example, the assessment may detect recurring patterns to reveal that the user has a deleterious or beneficial habit. By identifying the recurring patterns that contribute to the user's unfavorable behavioral outcomes, strategy plans can be devised to take corrective actions to make changes to behaviors that compromise values, are misaligned with priorities and that may negatively impact the user's future wellbeing. In other embodiments, the device can be programmed to monitor one or more biological parameters of a user to detect recurring patterns indicative of distress related to one or more undesirable habits, such as smoking, overeating, gambling, and drinking. Then, the device can be used to devise a plan to mitigate such undesirable habits.

Cognitive dissonance is not always caused when engaging in unhealthy habits (i.e. smoking). Cognitive dissonance can also occur when a user is making positive changes, for example, when beginning a fitness routine. Initially, when the user decides to start exercising, cognitive dissonance may develop between a choice to avoid exercising and the associated pain and another choice that exercise is good for the user. The user's goal is to successfully change their fitness habit by developing and implementing a plan that aligns with the newly adopted fitness behavior.

In various embodiments, the monitoring device may include a built-in scanner for performing a preauthorization, for example, during a financial transaction at the retail store, before the user is permitted to finalize a financial transaction at a point-of-sale. The built-in scanner is capable of remotely linking to a network capable of authorizing a transaction with one or more credit cards. The user cannot use the credit card to make a purchase or conduct a transaction for a particular product if the product is not initially scanned for preauthorization by the scanner prior to the purchase. When the transaction exceeds a predetermined amount or is unauthorized, it sends an alert to another person, such as a parent or spouse or an accountability partner who has the authority to authorize the purchase. This enables the accountable person to dynamically control, for example, a child's purchase. This may also be used as in the accountability relationship with a client who has engaged a financial coach.

Various embodiments of the method and apparatus described herein provide a software program for a cognitive dissonance mitigation system such as, for example, based upon specific life beliefs, values and ideas. Various embodiments of the method and apparatus include an electronic searchable database containing cognitive dissonance mitigation or management rules. For example, a cognitive dissonance mitigation rules database may be automatically searchable by a user to identify a scenario or example which is applicable to a particular behavioral situation.

Various embodiments of the cognitive dissonance mitigation rules database may provide a computerized instructional guide to assist a user with learning cognitive dissonance mitigation concepts and behavioral strategies. Various embodiments of the cognitive dissonance mitigation rules database and faith-based rules database described herein provide a user with interactive course material lesson plans the user may operate and study at the user's convenience. In various embodiments, the lesson delivery system displays a menu of selectable lessons to a user and retrieves the selected lesson for display to the user. Various embodiments of the cognitive dissonance mitigation rules database and faith-based rules database enables an interactive application that provides a lesson delivery system that the user can use independently to develop a behavioral plan and to learn cognitive dissonance mitigation principles.

In various embodiments, the cognitive dissonance mitigation rules database and faith-based rules database may be used as a presentation aid to facilitate training. In various embodiments, the cognitive dissonance mitigation rules database and faith-based rules database can be administered by a professional therapist, medical professional, counselor or life coach who interviews a subject to gather the subject's behavior information. Various embodiments provide an iterative application that can be operated by the subject as a mechanism to collect, compile and/or generate preliminary data, which is then delivered to the professional therapist, medical professional, counselor or life coach for further analysis, for example, to generate a cognitive dissonance mitigation plan, behavioral report, or behavior pattern recognition assessment.

With reference now to the figures, FIG. 1 depicts a pictorial representation of a network of data processing systems 100 in which the cognitive dissonance mitigation rules database of the present teachings may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, a wearable biometric sensor device 3000 (FIG. 5), 6000 (FIG. 9) and clients 108, 110, and 112 also are connected to network 102. These clients 108, 110, and 112 may be, for example, personal computers, network computers or a wireless device. In the depicted example, server 104 provides data, such as boot files, operating system images, and applications to clients 108-112. Clients 108, 110, and 112 are clients to server 104.

Figure 5:
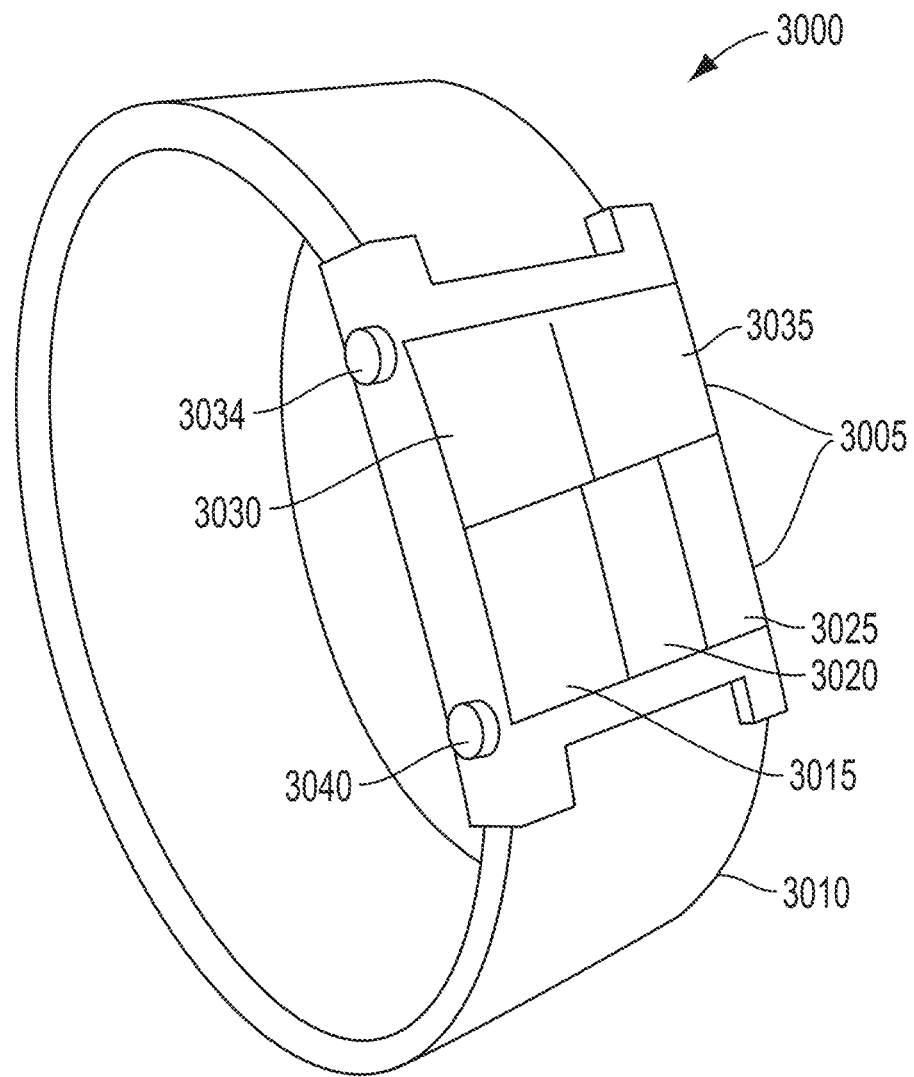
FIG. 5 is a component diagram of a biometric sensor device suitable for use with various embodiments of the present teachings.
Figure 9:
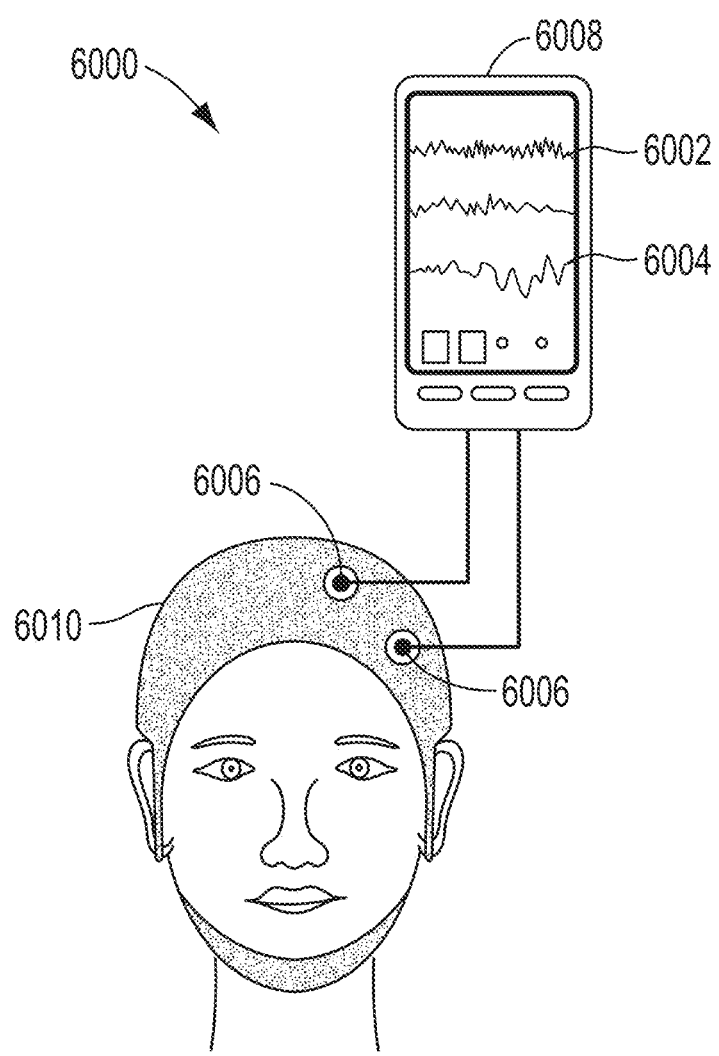
FIG. 9 illustrates an electroencephalogram apparatus according to an embodiment of the present teachings.

One or more wearable biometric sensor device 3000, 6000, as shown in FIGS. 5 and 9, respectively, are also connected to the network 102. The one or more wearable biometric sensor device, operating alone, in combination or sequentially, can be used for monitoring and capturing biological data as a user engages in decision making, a behavior or a transaction. For example, biological data can be captured while a user conducts a financial transaction (i.e. shopping). In another example, biological data can be captured during a behavior review (i.e. a behavior planning session). The devices and methods of the system perform an analysis to determine whether the decision, behavior or transaction is adverse to the user's priorities. If the decision, behavior or transaction is adverse, the devices and methods provide a stimulatory effect to the user to mitigate the adverse decision, behavior or transaction based on the user's specific priorities. Exemplary embodiments of wearable biometric sensor devices 3000, 6000 will be described in further detail below.

In FIG. 1, network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. In various embodiments, network data processing system 100 also may be implemented as a number of different types of networks, such as for example, an intranet, a local area network (LAN), or a wide area network (WAN). FIG. 1 is intended as an example, and not as an architectural limitation for the present invention.

Specifically, a data processing system according to the present teachings may be implemented as a server, such as server 104. The data processing system may include electronic and/or program product and instruction means and data for performing a cognitive dissonance mitigation, management and planning processing. In various embodiments, the data processing system may be described as a personal computer, such as a desktop or portable computer. However, as utilized herein, the terms "data processing system," "computer," and tool can be used interchangeably, and are intended to mean essentially any type of computing device or machine that is capable of running a software product, including communication devices (e.g., pagers, telephones, electronic books, etc.) and other computer-based networked devices (e.g., handheld computers, Web-enabled televisions, home automation systems, multimedia viewing systems, etc.). Those skilled in the art will appreciate that the system and method may be practiced with other computer system configurations, including, for example, hand-held devices, multiprocessor systems, microprocessor-based or programmable consumer electronics, minicomputers, and mainframe computers.

A user may enter commands and/or information, as discussed below, into the network data processing system 100 through input devices such as a mouse and keyboard connected to the network data processing system. Other input devices may include a microphone (or other sensors), joystick, game pad, scanner, or the like.

Various embodiments of the system and method of the cognitive dissonance mitigation rules database and faith-based rules database provide an iterative application that can be operated by the user as a mechanism to collect, compile and/or generate preliminary biological and/or behavioral data, which may then deliver to a professional therapist or medical professional for further analysis, for example, to generate a behavior plan or assessment. In lieu of or in addition to delivering the collected information to a professional therapist, the user may personally assess, analyze and/or use the compiled information.

The user may use the wearable biometric sensor device 3000, as depicted in FIG. 5, while preparing his cognitive dissonance mitigation plan to monitor the user's biological data and detect the user's stress level in response to the user's decisions, behavior or transactions. The user may don wearable biometric sensor device 3000, 6000 at the beginning or during the planning session. Biometric sensor device can be any device that can be worn by the user and is capable of obtaining biometric signal. FIG. 5 depicts an exemplary embodiment of a biometric sensor device as a wristband wireless device 3000, and FIG. 9 depicts an exemplary embodiment of a biometric sensor device as an electroencephalography (EEG). Biometric sensor device can be any device that can be worn by the user and is capable of obtaining a biometric signal. Non-limiting examples of suitable wearable biometric devices are a wristband, wristwatch, bracelet, arm band, ankle band, chest band, necklace, ring, belt, glasses, clothing, hat, headband, earring(s) or visor, or any other wearable item that is capable of obtaining a biometric signal. The biometric sensor device can also be incorporated into clothing, as smart clothing. In another embodiment, the biometric sensor device may comprise more than one biometric sensor. Biometric sensor device 3000, 6000 may be arranged to communicate with one or more of client computer 108, 110, 112 over a network, such as wireless network 102. Further, biometric sensor device 3000 may be arranged to communicate with server, and/or a cloud computing environment over a network.

FIG. 5 illustrates an embodiment where the biometric device is a wristband wireless biometric sensor device 3000. The exemplary biometric sensor device 3000 may include a display, a band body, a user interface, processor, biometric sensor(s), stimuli unit, memory, and/or wireless transceiver which may communicate with a client and/or server. A touch screen display 3005 serves as a user interface and is located on the outer side of the band body 3010. The biometric sensor device 3000 may also include one or more buttons 3034, 3040 as an interface for the user to interact with the biometric sensor device to receive user inputs. The processor 3030 may be coupled to an internal memory 3035, which are both internal components built and installed within the device 3000. The processor 3030 may also be coupled to the touch screen display 3005. The biometric sensor device 3000 may include a transceiver (e.g., a Bluetooth, Zigbee, or Peanut radio) for sending and receiving wireless transmissions.

The biometric sensor device 3000 may also include a stimuli unit 3015 for applying a stimulus to a user wearing the biometric device. The stimuli unit 3015 can be located on the inner side of the band body 3010 to apply one or more stimuli directly to the user's skin. In other embodiments, the stimuli unit 3015 may not be in direct contact with the user's body. The biometric device may include a battery.

The biometric sensor device 3000 may also include one or more biometric sensors 3020, such as, for example, a perspiration sensor, a body temperature sensor, a pH sensor, a blood pressure sensor, a blood sugar level, a pulse rate sensor, a blood oxygen level sensor, and an accelerometer coupled to the processor. The above list of exemplary sensors is not an exclusive one.

The biometric sensor device 3000 may collect one or more types of biometric, physiological, and/or environmental data from embedded sensors and/or external devices and communicate or relay such information to other devices, client(s) and/or server over the Internet. Additionally, the terms "detecting," "sensing," "monitoring," "tracking," "recording" and "storing" may be used interchangeably herein where appropriate, unless otherwise indicated. In the illustrated embodiment, sensor 3020 is located on the inner side of the band body 3010. The sensor 3020 is configured to measure various conditions of the user such as perspiration level, skin/surface temperature, heart rate, etc. In one embodiment, at least one temperature and perspiration sensor are in physical contact with the user for measurement. In other embodiments, one or more of the sensors may be an infrared sensor that is capable of measuring a body condition, such as external body temperature, of the user from a distance.

According to one example, while the user is wearing the biometric sensor device 3000, the biometric device may monitor the user's perspiration level and store the user's perspiration level using one or more sensors (for example, the perspiration sensor). In some embodiments, the perspiration sensor may monitor the content of the user's sweat. Perspiration consists of water, minerals, lactate and urea. On average, the mineral composition is: sodium (about 0.9 gram/liter), potassium (about 0.2 g/l), calcium (about 0.015 g/l), and magnesium (about 0.0013 g/l). Trace metals that the body excretes in sweat include: zinc (about 0.4 milligrams/liter), copper (about 0.3-0.8 mg/l), iron (about 1 mg/l), chromium (about 0.1 mg/l), nickel (about 0.05 mg/l), and lead (about 0.05 mg/l). In some embodiments, the perspiration sensor(s) may measure a single sweat component. In other embodiments, the perspiration sensor(s) may simultaneously and selectively measure multiple sweat components.

The biometric sensor device 3000 may then transmit the biometric data representative of the user's sweat level, physiological data, and/or the environmental data to a network system 100, client 108, 110, 112, computer, or server 104 where the data may be stored, processed and displayed. The biometric sensor device 3000 may measure or calculate a plurality of metrics in addition to the perspiration level and perspiration content. These include, but are not limited to, heart rate, location and/or motion through a GPS or similar locating device, blood pressure, blood glucose, skin and/or body temperature, brain activity as measured by electroencephalography, pH levels, and hydration levels. The biometric device may also measure or calculate metrics related to the environment around the user.

Furthermore, the device or system may calculate the user's stress through a combination of collected data. The device or system may employ various biosignal processing technologies, including wearable sensors, for detecting the user's stress, such as respiration and skin temperature, blood pressure, blood volume pulses, electroencephalography (EEG), electrocardiography (ECG), electromyography (EMG), and galvanic skin resistance. The biometric sensor device 3000 can be employed to process and analyze the biosignal data. After collection of the biosignals, the system and method calculate stress indices value of cognitive data and physical data. The stress indices value is calculated to establish the user's stress level.

In various embodiments, the device can be used to detect stress while the users initially develop their goals and priorities during a therapist session. If the device detects that the user's stress level exceeds a predetermined level, it provides an alert that the user is experiencing an elevated stress response that is indicative of an emotionally-charged issue or potential behavioral trouble spot that the user, therapist may need to probe into further or evaluate.

Various embodiments provide an apparatus and method that instantaneously and dynamically during a transaction or a decision detects a user's propensity to engage in emotionally impulsive behavior based on the user's biological data. Such embodiments will be described in further detail below. Various embodiments provide an apparatus and method that performs a comparative analysis that ensures that the user is using his or her resources in a manner that is consistent with the user's values, vision, life goals, priorities, and planned intentions as developed according to the user's behavioral plans or objectives.

In addition, the device can be employed, during a behavioral analysis review, as users review their decisions, behaviors, or transaction patterns to determine whether outcomes as a result of their past behaviors have been in alignment with the user's goals and plans. The device can be worn at the time the user reviews the data to detect, for example, heart rate as well as the presence of perspiration. Because these two exemplary biological parameters are natural responses to the stress the users may experience when reviewing their behavioral choices. The device will detect distress in the users and determine whether or not they are satisfied with the way they are conducting their decisions, behaviors or transactions based on the goals they have established according to their behavioral planning or objectives.

In various embodiments, during a behavioral review, the system's computational analysis may reveal the consequences of specific habitual behaviors or persistent choices that are either directly or indirectly influencing the user's ability to achieve his or her personal objectives or goals. For example, the assessment may detect, based on the user's information, recurring patterns to reveal that the user exhibits a deleterious habit. By identifying the recurring behavior patterns that contribute to the user's subpar behavior outcomes, recommended strategies can be devised by the system and displayed or transmitted to the user to direct the user towards corrective actions to produce more favorable outcomes and to better prioritize the use of their resources. In other embodiments, the device can be programmed to monitor one or more biological parameters of a user to detect recurring patterns indicative of distress related to one or more undesirable habits, such as smoking, overeating, gambling, and drinking. Then, the system and device can be used to devise a plan to mitigate such undesirable habits.

Various embodiment of the method and apparatus described herein provide a monitoring device to provide stimuli to the user. Many types of stimuli may be used and are contemplated herein. For example, the stimuli may be auditory, tactile (touch), vibratory, pressure, temperature (warm, cold, neutral), visual stimuli including images and video, or any combination thereof.

For example, some of such types of stimuli are described in further detail below. A speech stimulus may include certain words, sentences, content or affect, presented using sound or visually. A tactile stimulus may include pressure level for a constant stimulus, frequency for a vibratory stimulus, temperature. Visual stimuli may be based on color, pattern, image content, video content, motion content, direction, orientation, size or other features. The preferred embodiment is directed towards a tactile stimulus that is applied directly to the user's skin.

In various embodiments, different stimuli may be selected, the intensity adjusted, and applied to user. These stimuli may be combined or applied individually according to a predetermined order. In some embodiments, the stimuli may be applied to a plurality of different body parts of the user.

A variety of types of devices may be used, individually or in combination, for application, mobile application, social network, virtual reality googles, thermal probe, pneumatic pressure probe, mechanical pressure probe and smart clothing that includes biometric sensors. Future models may incorporate implantable sensors that are inserted under the user's skin. The data representing such stimuli may be stored either directly on the delivery/presentation device(s) itself (e.g., in non-transitory computer-readable media incident to, collocated or otherwise incident to the delivery/presentation device). In some embodiments, the data representing the stimuli is stored or represented remotely from the delivery/presentation device(s), e.g., in a data store of a computing resource provider. In such embodiments, devices may connect to (and retrieve the stimuli and associated data from) the entity storing the stimuli and associated data via any appropriate direct or programmatic interface. Examples include APIs, Wi-Fi, Bluetooth, cellular protocols (such as LTE, HSPA, GSM, CDMA, WiMAX and the like), Web services (including those using representation state transfer (REST) and/or Simple Object Access Protocol (SOAP)), Web interfaces (programmatic and otherwise), network protocols such as TCP/IP, and the like stimuli may be stored in any appropriate format, including audio file formats such as MP3, MP4, AAC, video file formats such as MPEG, and others.

As discussed above, according to one example, the device 3000 can use sensor 3020 (i.e. a perspiration sensor) to detect stress by monitoring the user's perspiration level while the users initially make financial decisions to develop their financial goals and priorities during a financial planning session. If the device detects that the user's perspiration level exceeds a predetermined level, or one or more sweat components exceed a predetermined level, the device instructs the stimuli unit 3015 to apply one or more stimuli to the user to alert the user and reduce the user's stress level. For example, if one or more of the sweat components exceed the average listed above on a per liter basis by at least 5%, then the stimuli unit 3015 applies a pressure, similar to an acupuncture pressure, for example 2-5 minutes. The intensity level of the stimuli applied to the user to mitigate the stress can be adjusted automatically or manually by the user. For instance, the level, for example of the stimuli and the stress, can be reported in binary (e.g., yes/no), semi-quantitative (e.g., low, medium, and high), quantitative format (numerical) and/or qualitative format (categorical—e.g., color scheme).

The cognitive dissonance mitigation rules database assists users with building a clear behavioral assessment. The process can be performed electronically during a single session or conducted over several sessions at the user's convenience to complete one or more evaluation tools. For instance, the user may initially determine the information needed for a particular evaluation tool, take a few days or weeks to collect the needed information and then conduct a follow-up session to enter the information. Using the cognitive dissonance mitigation rules database, users can record in and assess through the use of several evaluation tools many aspects of their life goals and objectives. The cognitive dissonance mitigation rules database may be used to collect and record information in worksheets, reports, tests, assignments, quizzes, ledgers, questionnaires, and behavioral assessments. Provided below are examples of information that may be collected when assessing a user's behavior regarding financial planning.

| | Financial Planning Personal Goals and Priorities Worksheet |
|---|---|
| Expense Record Log | Statement of Financial Position |
| Weekly Spending Report | Cash Flow Statements |

| | Financial Planning Personal Goals and Priorities Worksheet |
|---|---|
| Monthly Income and Expenditure Analysis Worksheet | Values and Vison Statement Reflection Questionnaire |
| Weekly Expenditure Worksheet | Budget Ratio Analysis |
| Assessment Tests | Summary of Financial Findings |
| 1. Personal Values Assessment | |
| 2. Money Attitudes Assessment | |
| 3. Spending Behavior Assessment | |
| 4. Money Behavior Motivation Assessment | |
| 5. Money Management Assessment | |
| Personal Vision Statement | |
| Debt Ledger | Statement of Financial Findings |
| Debt Tracker | Finance and Financial Values Questionnaire |
| Savings Record | Commitment Strategy Worksheet |
| Loan Transaction Ledger | Income Allocation Adjustment Worksheet |
| Balanced Goal Worksheet | Interactive Goal Planning Calculator Applications |
| | 1. Goal Funding Planner |
| | 2. Target Accumulation Planner |
| | 3. Retirement Savings Goal Calculator |
| Balanced Priorities Worksheet | Spending and Savings Plan |

The above list is not exhaustive. Those having skill in the art would understand that other assignments or tasks may be employed in conjunction with the present teachings.

The evaluation tool may present questions to the user according to various approaches including: (i) multiple choice questions; (ii) true/false questions; (iii) short answer or "fill-in-the-blank" questions; (iv) essay or "free-form" answer questions; (v) practical problem solving; or (vi) personal interview. Accordingly, the user's responses to the questions may be analyzed, scored, and graded electronically or manually using any known grading, modeling, analytic resolving, character recognition and scoring systems and methods.

The evaluation tool may collect user information relevant to behavioral factors, as well as economic and non-economic factors that influence a user's behaviors and decisions. Changes required to improve behavior, however, include examining thoughts and behaviors and how they impact the user's economic circumstances. The embodiment includes various evaluative assessments to identify key issues associated with problematic decision making. The influences may be categorized, for example, into four key areas that will help the user isolate specific categorical factors that he/she may need to focus primary attention to in order to alter behaviors that can increase their potential to achieve values-based goals and priorities. Awareness of specific hindrances in these areas can enable the user to receive and apply targeted guidance that helps them work toward adjusting and realign economic behaviors that support their true goals and values-based life plans.

These exemplary categories, as shown in FIGS. 2A-3B, may include for example:
 1. Values and Beliefs
 2. Attitudes
 3. Beliefs As shown for example in FIGS. 2A-2B, one example of a mechanism that may be employed in the cognitive dissonance mitigation rules database is to gather and compile preliminary information is a Values and Belief assessment. The Values and Belief assessment can aid the user to determine the primary human values that relate to their life concerns. On a general level, the present teachings can include collecting information and building a model based on the information. Such a model can then be used to generate a user-specific decision framework that serves as reference point to guide the user's personal choices, life plans and decisions. This model will serve to make comparisons of the user's behaviors and supposed values to determine whether they are in alignment. The comparison evaluation will serve to highlight values-decision conflicts in assessing specific decision factors under the personal value key insight category.

Figure 2A:
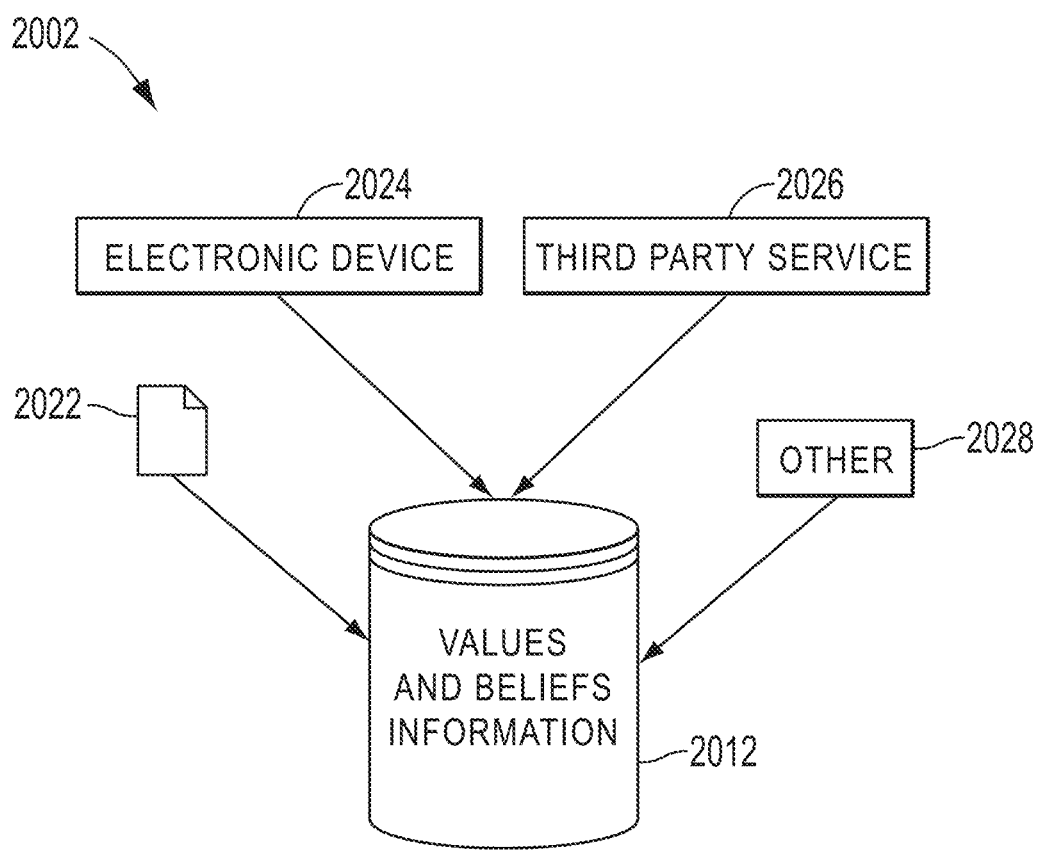
FIG. 2A illustrates a variety of sources for collecting Values and Beliefs information in accordance with the cognitive dissonance mitigation rules database of the present teaching.

The values and beliefs information can include any information, such as, for example, behavioral, and psychological priorities, relationship and community priorities, health and environmental priorities, and financial priorities collected about an individual. FIG. 2A shows a variety of sources 2002 for collecting values and beliefs information 2012. The values and beliefs information 2012 can be stored in electronic (e.g., digital) form in a computer-readable medium (e.g., RAM, ROM, magnetic disk, CD-ROM, CD-R, DVD-ROM, and the like). Possible sources for collecting the values and beliefs information 2012 include a paper-based source 2022 an electronic device 2024, a third-party service 2026, or some other source 2028. The values and beliefs values information can include, for example, a user's answers to an on-line values and beliefs quiz. As shown, for example in the method 2100 in FIG. 2B, the quiz may present questions to the user regarding categories of human priorities that that the user deems are intrinsically important to who they are and how they live their life.

Figure 2B:
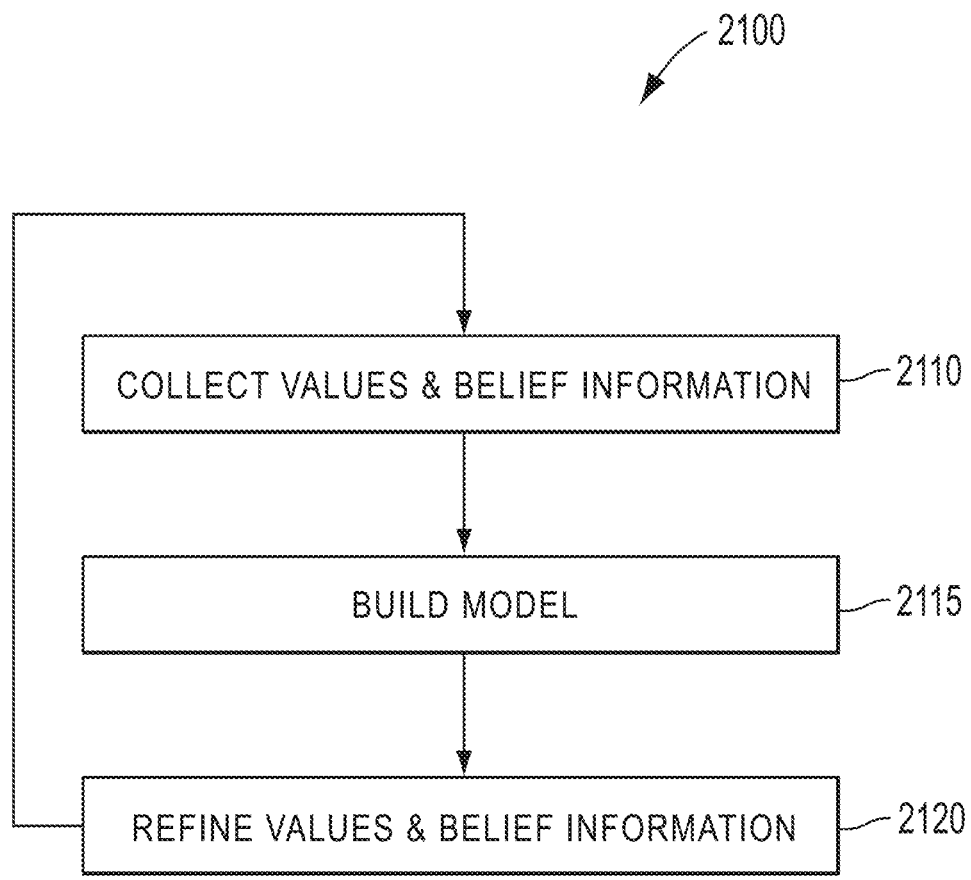
FIG. 2B depicts a Values and Beliefs model in accordance with the cognitive dissonance mitigation rules database of the present teachings.

After the values and beliefs information 2012 has been collected in step 2110, a user-specific values and beliefs decision model 2115 can be built as shown in FIG. 2B. The values and beliefs model can take a variety of forms, including artificial intelligence-based models. The values and beliefs model can generate one or more life values profiles based on the user's values information inputs. Thus, the model can be used to identify the personal values that the user ranks most important as important in living out a values-guided life. In practice, the model can be implemented as computer-executable code stored in a computer-readable medium. In step 2120 the user's values and beliefs may be subsequently refined to adjust to transitional life changes and shifts in values over time.

Figure 2C:
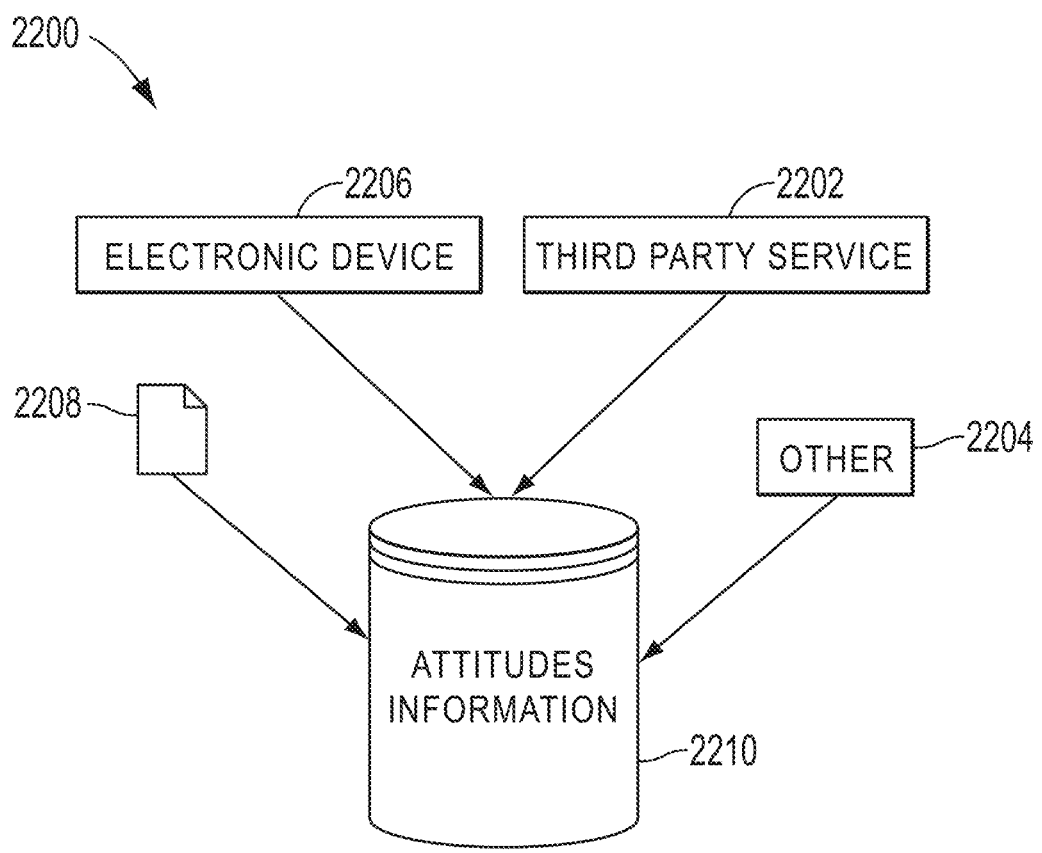
FIG. 2C illustrates a variety of sources for collecting Attitudes information in accordance with the cognitive dissonance mitigation rules database of the present teaching.
Figure 2D:
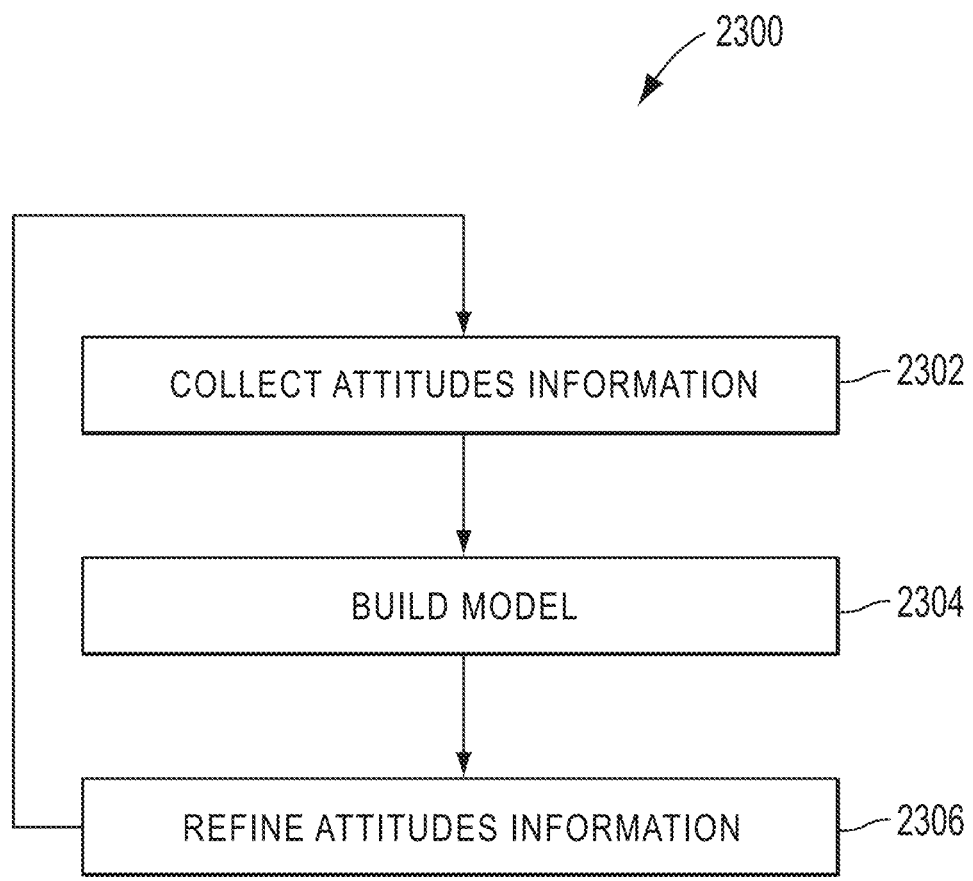
FIG. 2D depicts an Attitudes model in accordance with the cognitive dissonance mitigation rules database of the present teachings.

As shown for example in FIGS. 2C-2D, one example of a mechanism that may be employed in the cognitive dissonance mitigation rules database to gather and compile preliminary information is a attitudes assessment. The attitudes model will be employed in the cognitive dissonance mitigation rules database to gather and compile preliminary information and can utilize a variety of evaluations, including attitudes assessment. The Attitudes Assessment can aid the user in identifying and clarifying a user's attitudes about the use and purpose of behavioral planning. On a general level, the present teachings can include collecting information and building a model based on the information. Such a model can then be used to generate attitudes profile, which forms recurring pattern of the user's behaviors. This model will be used to make comparisons between the user's attitudes and their values and behaviors to determine whether there are inconsistencies that pose barriers in reach behavior and/or personal goals. This model will be employed under the attitudes key insight category.

The attitudes information depicted in the method 2200 can include any collected information, such as, for example, a person's attitude towards their family, society and economics. FIG. 2C shows a variety of sources for collecting attitude information 2210. The attitude information 2210 can be stored in electronic (e.g., digital) form in a computer-readable medium (e.g., RAM, ROM, magnetic disk, CD-ROM, CD-R, DVD-ROM, and the like). Possible sources for collecting the attitudes information 2210 include a paper-based source 2208, an electronic device 2206, a third-party service 2202, or some other source 2204. The attitude information can include, for example, a user's answers to an on-line quiz. As shown, for example in the method 2300 in FIG. 2D, the quiz may present questions to the user regarding attitude toward family relationship, society, traditions, culture, professional status and work environment.

After the attitudes information 2210 has been collected in FIG. 2C, an attitudes model 2304 can be built as shown in FIG. 2D. The behavioral model in FIGS. 3A-3B can take a variety of forms, including artificial intelligence-based models. The behavioral model can generate one or more behavioral profiles based on attitudes information inputs in step 2302. Thus, the model can be used to identify the tendencies, priorities, values, and attitudes of the user related to the management of their cognitive dissonance based on their decisions, behaviors or transactions. In practice, the model can be implemented as computer-executable code stored in a computer-readable medium. In step 2306, the user's attitudes can be subsequently refined as the user develops a reprioritized focus in managing his or her decisions, behaviors or transactions. This model will be employed under the behavioral key insight category.

Figure 3A:
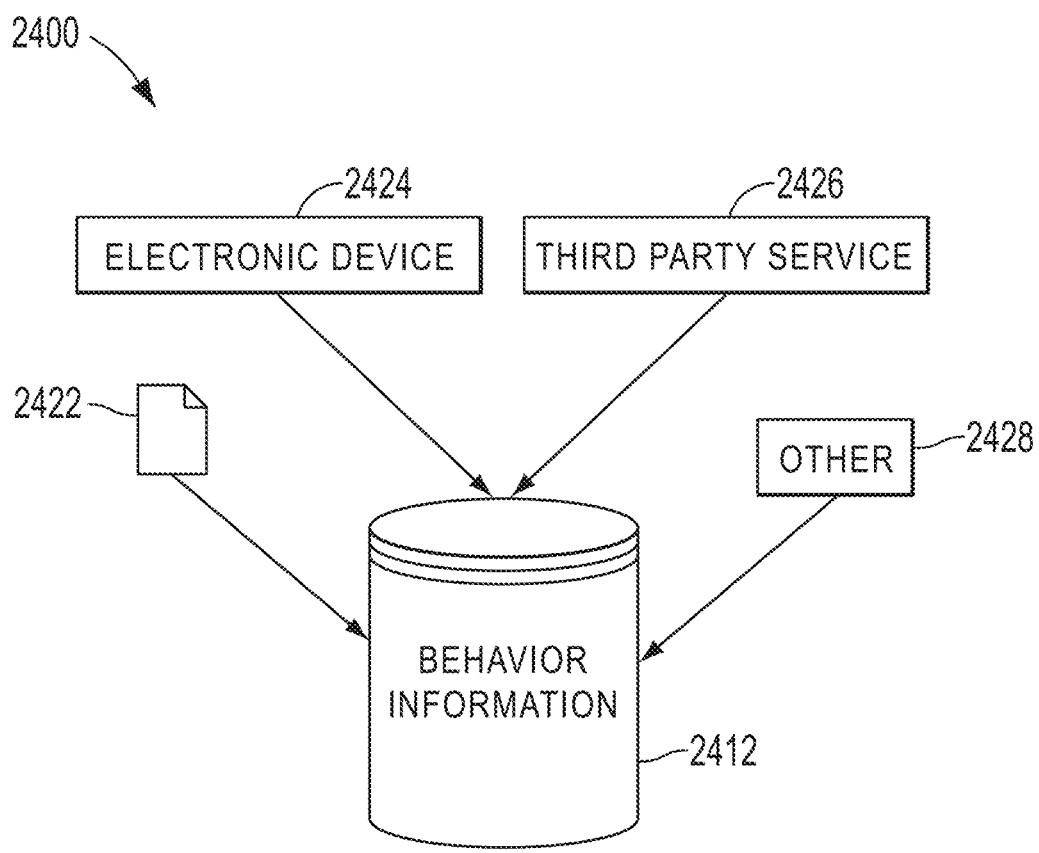
FIG. 3A illustrates a variety of sources for collecting Behavior information in accordance with the cognitive dissonance mitigation rules database of the present teaching.
Figure 3B:
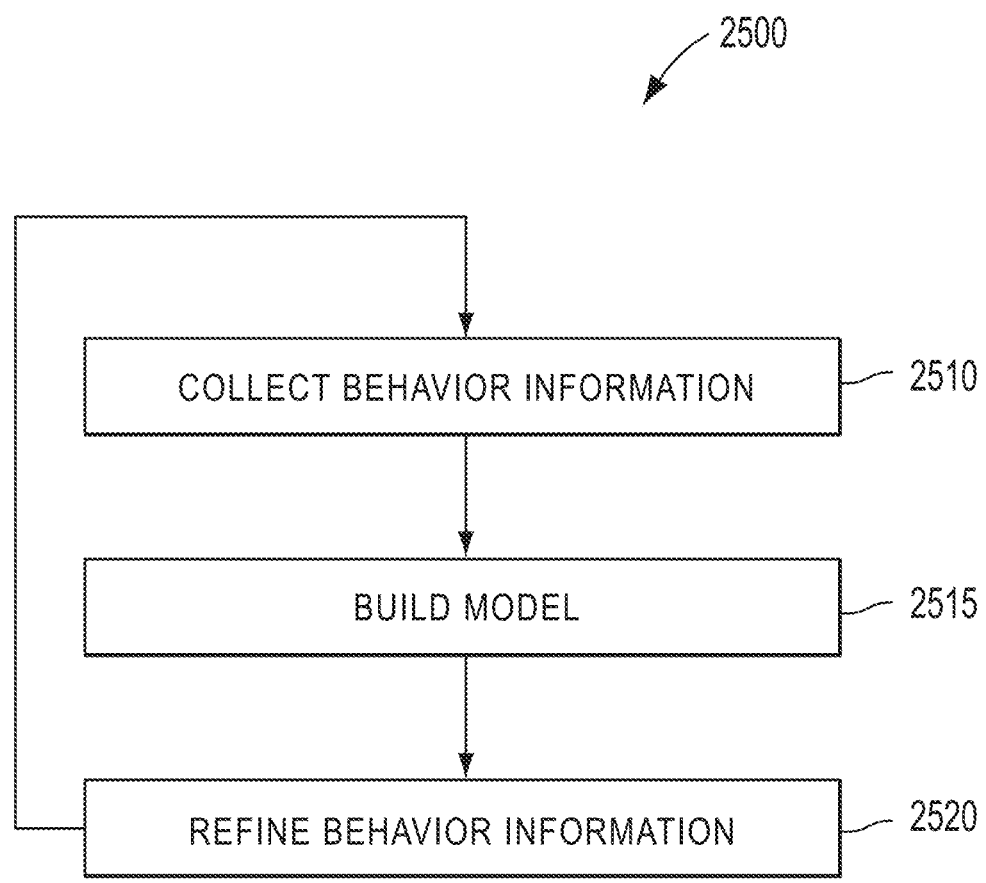
FIG. 3B depicts a Behavior model in accordance with the cognitive dissonance mitigation rules database of the present teachings.

As shown for example in FIGS. 3A-3B, one example of a mechanism that may be employed in the cognitive dissonance mitigation rules database is to gather and compile preliminary behavioral information. The behavior assessment will parallel focal areas related to values and beliefs categories. Information will be collected that evaluate the user's behavioral patterns of decision making and transaction. On a general level, the present teachings can include collecting information and building a model base on the information. Such a model can then be used to generate a behavioral profile of the user's behavioral. A comparison analysis can then be used to evaluate behavior-values conflicts. This model will be employed under the behavior key insight category.

The behavioral information can include any information, such as, for example, personal behavior, professional behavior, and financial behavior, collected about an individual. In the method 2400, FIG. 3A shows a variety of sources 4402 for collecting behavioral information 2412. The behavioral information 2412 can be stored in electronic (e.g., digital) form in a computer-readable medium (e.g., RAM, ROM, magnetic disk, CD-ROM, CD-R, DVD-ROM, and the like). Possible sources for collecting the behavioral information 2412 include a paper-based source 2422, an electronic device 2424, a third-party service 2426, or some other source 2428. The behavioral information can include, for example, a user's answers to an on-line behaviors quiz. As shown in the method 2500, for example in FIG. 3B, the quiz may present questions to the user regarding relationships, finances, past transactions, decision making process, beliefs, and planning for the future.

After the behavior information 2412 has been collected in step 2510, a behavioral model 2515 can be built as shown in FIG. 3B. The behavioral model can take a variety of forms, including artificial intelligence-based models. The behavioral model can generate one or more behavioral profiles based on behavior information inputs. Thus, the model can be used to identify or reveal the practices, patterns, habits, behaviors and choices related to the user's life and behavioral management. In practice, the model can be implemented as computer-executable code stored in a computer-readable medium. In step 2520, the user's attitudes can be subsequently refined as the user develops a reprioritized focus in managing his or her behavioral patterns.

Figure 4:
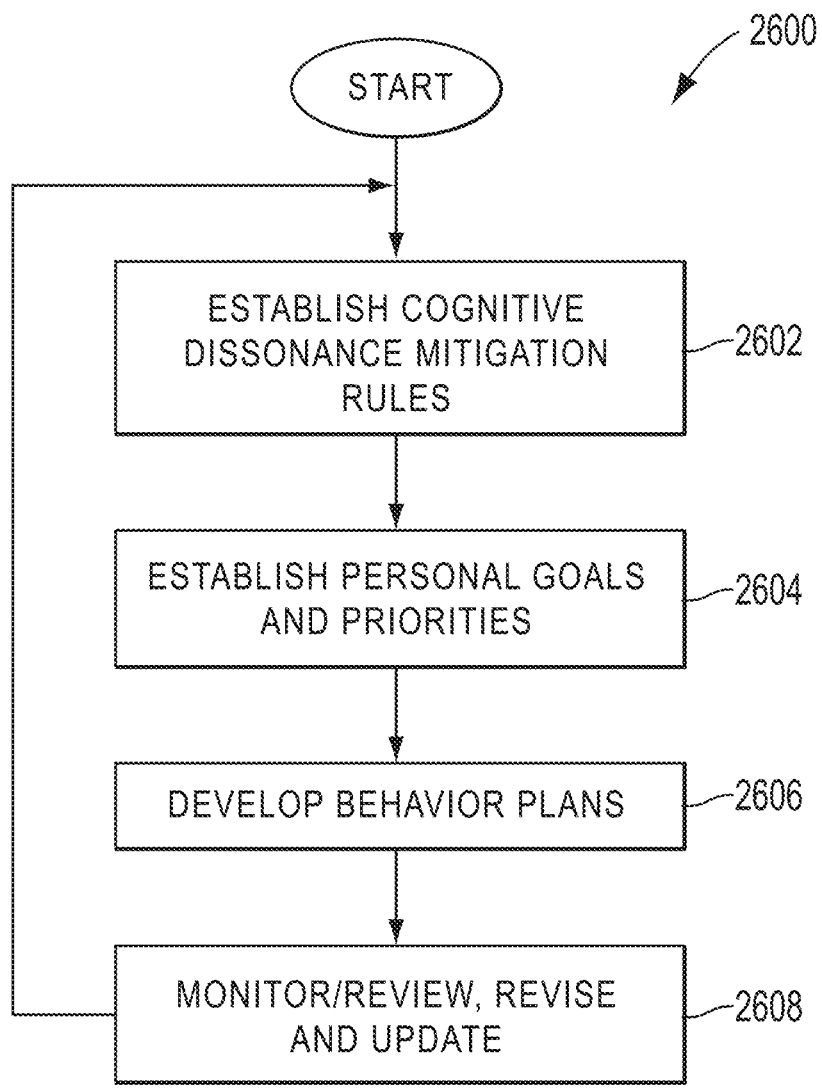
FIG. 4 is a flowchart illustrating an example of a general overview of a process used in a behavioral planning and management tool to implement the cognitive dissonance mitigation rules database.

FIG. 4 is a flowchart illustrating an example of a general overview of the process 2600 used in a behavior management tool to implement the cognitive dissonance mitigation rules database described above. In step 2602, a user initiates the cognitive dissonance mitigation rules database application to assist the user in determining his or her life goals. The process assists the user to establish personal goals and priorities (step 2604); develop behavioral plans (step 2606) and monitor/review, revise and update any previously prepared assignments, worksheets, or tasks (step 2608).

In one example of implementation of the system and method, the device 3000 may be a wrist band that will capture biological data during the monthly review of the individual's actual behaviors. Our methodology requires the users to engage in monthly analysis to monitor their actual behaviors. Because the behavioral analysis will be compared to the user's established priorities and goals, the review of the responses relating to their Values and Beliefs will precede the monthly review of the behavioral evaluation.

Step 1: The individual will strap the wrist band on their wrist, and their base heart rate and perspiration levels will be measured.

Step 2: The individual will then review the results of the prior assessments that were completed during the Values and Beliefs evaluative process. This includes results from their Values and Beliefs assessment model information in FIG. 2B, their Goals, Priorities, and Vision Statements, and other summary data used for defining their beliefs, values, and priorities.

Step 3: Directly afterwards, the user will review and analyze the month's behaviors as part of their behavior assessment area. Reviewing the stimulatory feedback reports, geofencing records of behavior, and other summary documents. This review will provide clarity about their actions, personal choices, decisions, habits, discipline, progress toward or deviation from their goals, and the consistency with which their behavior aligns with their stated values, priorities, and goals.

Step 4: Favorable consistency between the Values and Beliefs and behavior Assessment areas will cause little to no stress response. However, if the user has inconsistencies between their established intentions and what actually transpired during the month, then a biological stress response will be activated. This will register on the device and provide clear evidence of the deviation from their intentions.

The device 3000 can be configured to instantaneously and dynamically detect the emotional response based on the user's biological data collected by sensor 3020 and, in comparison to the user's priorities during a behavioral transaction. If a determination is made by the system 100 or device 3000, 6000 that the decision or transaction is adverse to the user's goals, the device is configured to instruct stimuli unit 3015 to provide a stimulatory effect to the user to mitigate the adverse decision based on the user's specific priorities.

In various embodiments, the device 3000 can be configured to detect the emotional distress experienced by a user to the decision and behavioral transaction by monitoring various body conditions of the user. The device may include a biometric sensor 3020 that is capable of measuring one or more body conditions, such as heart rate, perspiration level, and body temperature. In one embodiment, the device 3000 can be a wristband worn around the wrist of the user while shopping. In another embodiment, the device is a piece of smart clothing having one or more biometric sensors embedded therein and worn by the user while shopping. The biometric sensor 3020 can measure, for example, breathing, heart rate, and muscle tension to determine a number of health metrics, like stress level, anxiety, etc. When the user is stressed out, his breathing becomes shallow, his heart rate increases, and his body tenses up. The device 3000 can recognize one or more of these physical changes in the user's body and alert the user of these conditions. The emotional distress of the user can be estimated from the perspiration level, body temperature, heart rate, and a combination thereof using sensor 3020. If device 3000 determines based on the biometric data collected by sensor 3020 that the level of emotional distress exceeds a predetermined level, the system 100 or device 3000 instructs the stimulus unit 3015 of the device to generate and apply a stimulus to the user. The stimulus unit 3015 is configured to generate a stimulus under the control of the controller.

In various embodiments, the device 3000 (FIG. 5) may include a locating device 3025 that is capable of providing a signal that indicates the device's location. The locating device 3025 may include a Global Positioning System (GPS) device configured to generate a location signal indicative of a location of the device or any other known locating device that receives or determines positional information associated with the device. In addition to the GPS device, the device may include a motion sensor that is configured to detect one or more changes in position, velocity, acceleration, or orientation of the device. A controller may be provided in communication with the GPS device and the motion sensor. For example, the GPS device, the motion sensor, or a combination thereof can be used to track the location of the device. Based on the location signal received from the GPS device and/or the motion sensor, the controller can determine the device's location when the user enters a determined type of facility to conduct a behavioral transaction. When the controller using the locating device 3025 determines that the user while wearing the device enters such a facility, the controller activates a biometric sensor 3020 to begin obtaining biometric data from the user. When the biometric data exceeds a predetermined level, the controller instructs the stimuli unit 3015 to apply a stimulus to the user for a predetermined amount of time or until the biometric data falls below the predetermined level.

The biometric sensor device 3000 includes a transceiver configured to relay sensor and location data received via wireless signals to server 104 via a network, such as the Internet 102 or a local area network. Through the connection to the Internet 102, the server 104 may also exchange data with external devices capable of interacting with the Internet 102, such as smart phones, a laptop, other servers, and a cloud data storage device 106. The biometric sensor device 3000 may transmit data, such as biometric and location data, at pre-defined intervals.

Geo-fencing techniques can also be implemented in various embodiments according to the present teachings. Geo-fencing creates a virtual perimeter of a geographic area when a mobile device enters or exits the area. Geo-fences techniques may be used, for example, to send a notification if the user of the mobile device travels outside of the defined geographical area. Computer-implemented systems or applications in conjunction with GPS devices may detect such crossing and provide notifications, for instance, via mobile or another device.

In general, geofencing combines awareness of the user's current location with awareness of the user's proximity to locations of interest. To identify a location of interest, the latitude and longitude of the location is specified. To adjust the proximity for the location, a radius surrounding the location of interest is added. The latitude, longitude, and radius define the geofence, creating a circular area, or fence, around the location of interest.

Multiple active geo-fences can be defined. For each geo-fence, location service applications of the system can be programmed to detect entrance and exit events. The system can determine the geo-fencing event and determine the type of geo-fence transition(s) and determine which of the pre-defined geofences has been triggered. The location service application then sends a notification and logs the transition details. After the geo-fence expires, the location service application can automatically delete the geo-fence and stop monitoring the geo-fence. Removing a geofence can stop the monitoring immediately.

Figure 6:
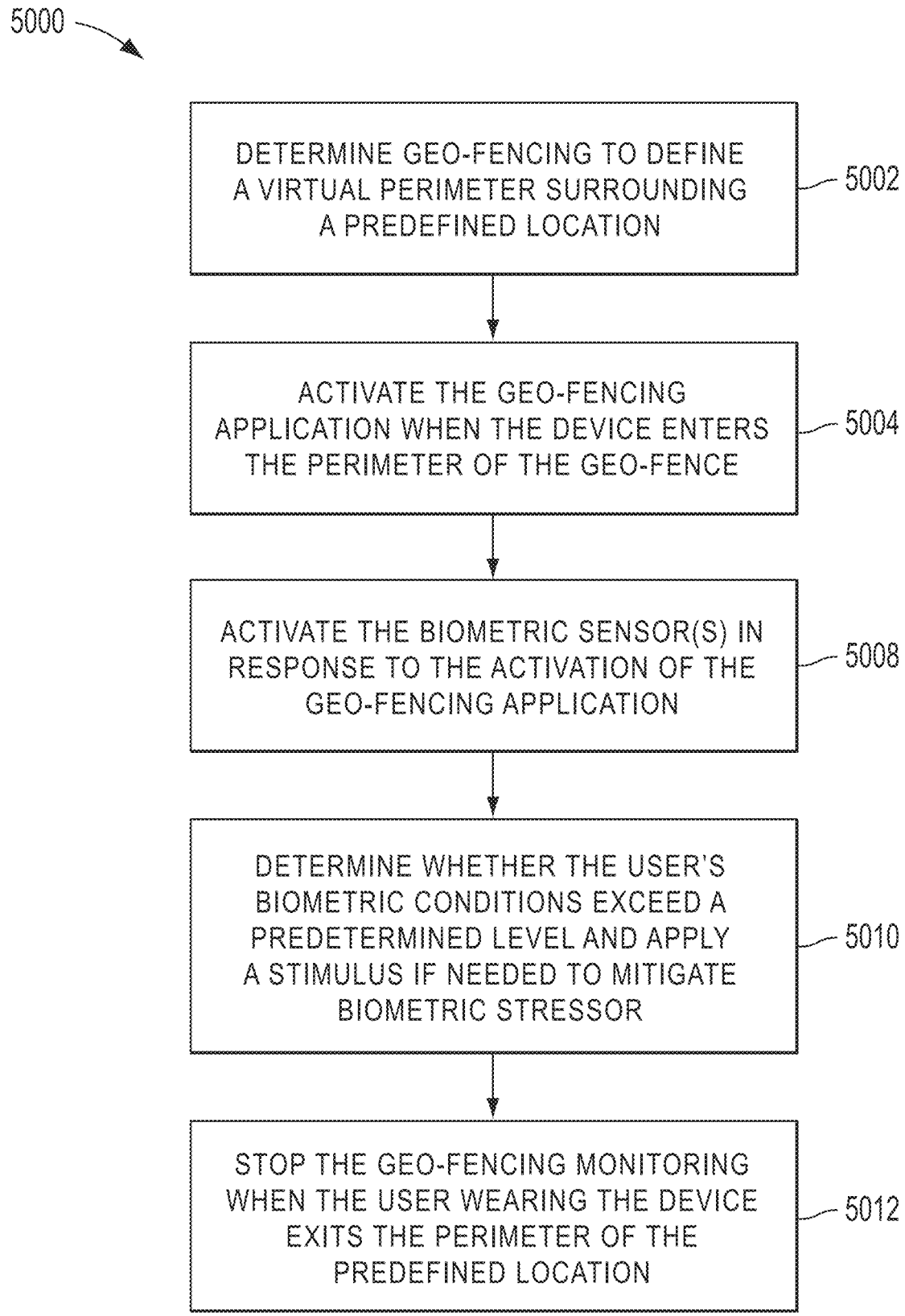
FIG. 6 is a flow diagram illustrating biometric geofencing area according to the present teachings.

FIG. 6 is a flow diagram illustrating a biometric geo-fencing area method 5000 according to an embodiment of the present teachings. At Step S002, a user's geo-fencing areas are identified. For example, a plurality of geo-fencing areas of one or more users may be determined based on detecting locations of one or more users, the locations detected via one or more user selected devices. The location of the one or more users may be monitored based on information received from the selected devices.

Historical data, such as history of locations, rate of movement, and timing information, can be stored and analyzed to determine the geo-fencing area for one or more of the users. For example, the stored information may provide the user's pattern of movement and duration of time spent in different places. In another aspect, using GPS and geographical mapping information, the system can calculate location information of local businesses and community information, such as shopping areas, gyms, bars, medical facilities, schools, grocery store, and banks.

Yet in another aspect, the system can automatically calculate the geo-fencing perimeter around the identified locations. In other embodiments, the user may be provided with a user interface to allow the user with an option to enter or confirm the user's geo-fencing perimeter around the identified locations. For example, the user's geo-fencing boundary can be automatically defined or entered as, e.g., 2 kilometer radius around a first local business (e.g., a grocery store) and 3 kilometer radius around a second local business (e.g. a gym), and so forth.

At Step S004, when the mobile device enters the perimeter of the geo-fence for a predefined location, the system automatically activates the geo-fencing application. At Step S006, when the system detects an entrance events, the system can determine the geo-fencing event and the type of geo-fence transition(s) and which of the predefined geofences has been triggered. For example, when the user crosses the geo-fence perimeter of a gym, the system can determine that geo-fence transition relates to a fitness goal.

As another example, the geo-fence perimeter may be defined to surround a financial facility where the user may conduct business transactions, such as a banking institution, or make personal financial decisions, such as a financial planner or financial counselor's office. In the example of a financial plannner or financial counselor's office, when the user crosses the geo-fence boundary, such as the entrance of a financial planner or financial counselor's office, the device is activated. During the financial planning session, the user may begin to experience stress as the financial planner presents a review of the user's financial anaylsis. Areas of review may entail an analysis of the outcomes resulting from the user's economic choice such as use of debt, spending and savings decisions, status of follow-through on recommended actions. For example, the user's stress level may be triggered as the planner or financial counselor presents an analysis of financial statements, budget variances or cashflow issues that relate to the user's choices that conflict with planned goals and intended actions.

In various embodiments, when the device detects a biometric stressor experienced by the user, the device may send a notification to the user and/or a third-party, such as the psychotherapist, a medical professional, or a parent. In the psychotherapy session example, the practiner can receive alerts of the stress levels generated as part of the review session of the user's therapy goal progress over a specified period. The system can send a notification to the therapist, counselor or coach regarding the user's behavioral inconsistencies so that they are aware of a stress alert. The practitioner can then be aware of the emotional triggers contributing to the user's adverse behavior and help the user focus on issues that mitigate the adverse choices and negative consequences impacting their goals.

At Step S008, in response to the activation of the geo-fencing, the system activates the biometric sensor to detect one or more conditions of the user and begins to transmit behavior data to the user via the user's device. The biometric device 3000 may collect one or more types of biometric, physiological, and/or environmental data from embedded sensors and/or external devices and communicate or relay such information to other devices, client(s) and/or server over the Internet.

In one example of a behavioral transaction, the device can be configured to detect the emotional distress experienced by a user to the decision and behavioral transaction by monitoring various body conditions of the user. The device may include a biometric sensor that is capable of measuring one or more body conditions, such as heart rate, perspiration level, and body temperature. In one embodiment, the device is a wrist band worn around the wrist of the user. In another embodiment, the device is a piece of smart clothing having one or more biometric sensors embedded therein. The biometric sensor can measure breathing, heart rate, and muscle tension to determine a variety of health metrics, like stress level, anxiety, etc.

When the user is stressed out, his breathing becomes shallow, his heart rate increases, and his body tenses up. The device can recognize all these physical changes in the user's body and alert the user of these conditions. The emotional distress of the user can be estimated from the perspiration level, body temperature, heart rate, and a combination thereof. At Step S010, if the device determines that the level of emotional distress exceeds a predetermined level, a stimulus generator unit of the device, for example, generates and applies a stimulus to the user to mitigate the biometric stressor. The stimulus generator is configured to generate a stimulus under the control of a controller. Namely, when a predetermined stress or body condition threshold is exceeded, the device applies a biometric countermeasure until the biometric stressor is mitigated. The stimulus generator is merely an example of a biometric stress mitigator that may be employed to reduce the user's stress. However, those skilled in the art would recognize that biometric stress mitigators may encompass a wide variety of stress reducers, such as instructing the user to take medication or call a support person.

At Step S012, when the user leaves the perimeter of the pre-defined location, the system automatically detects that the device has exited the geofence. The system then deletes the geo-fence and stops the geo-fence monitoring for the predefined location.

Figure 7:
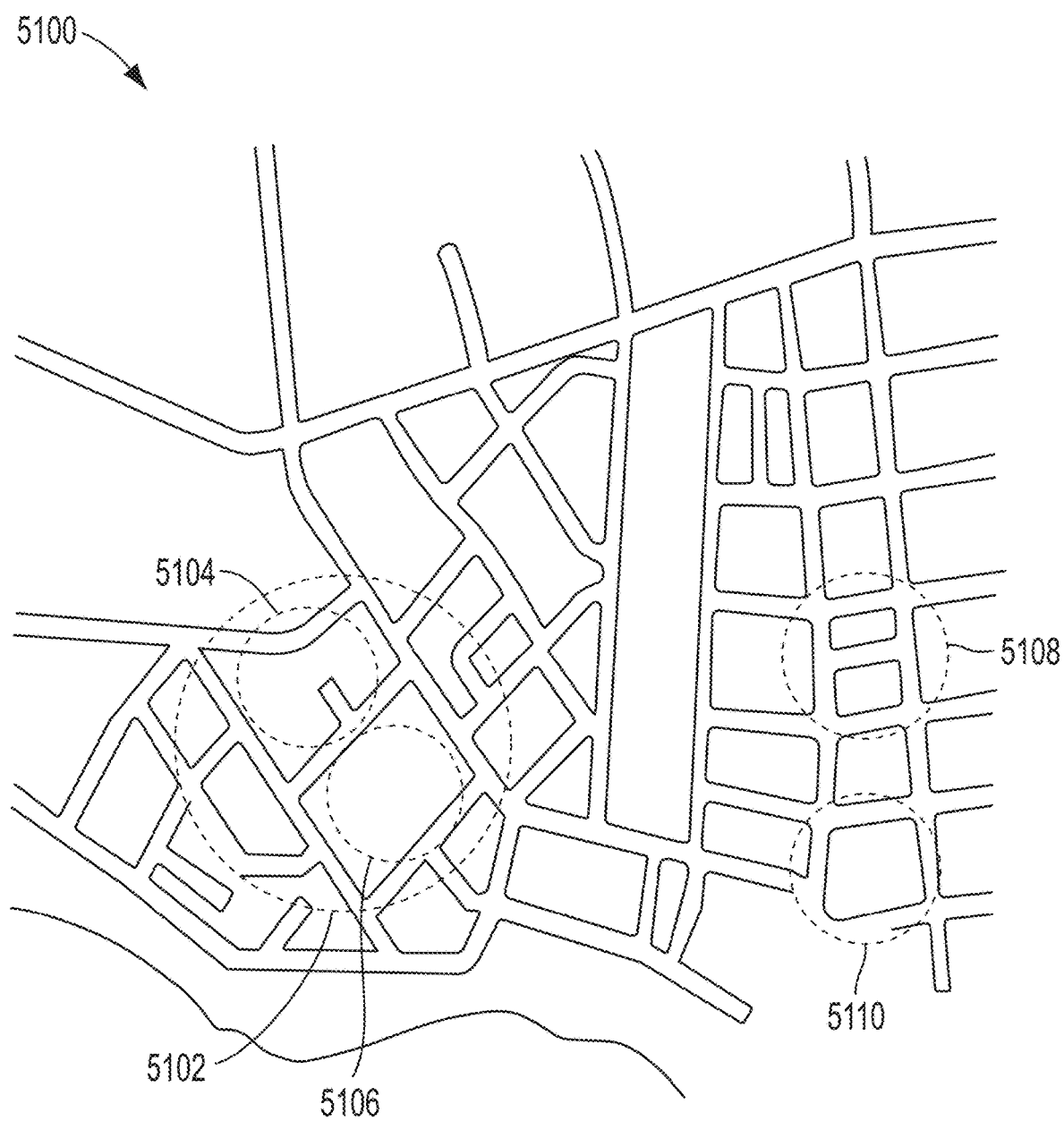
FIG. 7 illustrates an example of a geographical map with multiple geo-fences.

FIG. 7 illustrates an example of a geographical map 5100 with multiple geo-fences of multiple users (User A and User B) according to the present teachings. The system can define multiple active geo-fences. For example, in FIG. 7, the biometric geo-fencing area for User A has been divided to define three areas: a primary area 5102 and two sub-areas, area 5104 and area 5106 defined within the primary area 5102. The primary area 5102 can be defined to surround a shopping mall and the sub-areas 5104 and 5106 can be defined as specific stores located within the shopping mall. The biometric geo-fencing area for User B can be defined to have one or more geo-fencing areas 5108 and 5110.

Figure 8:
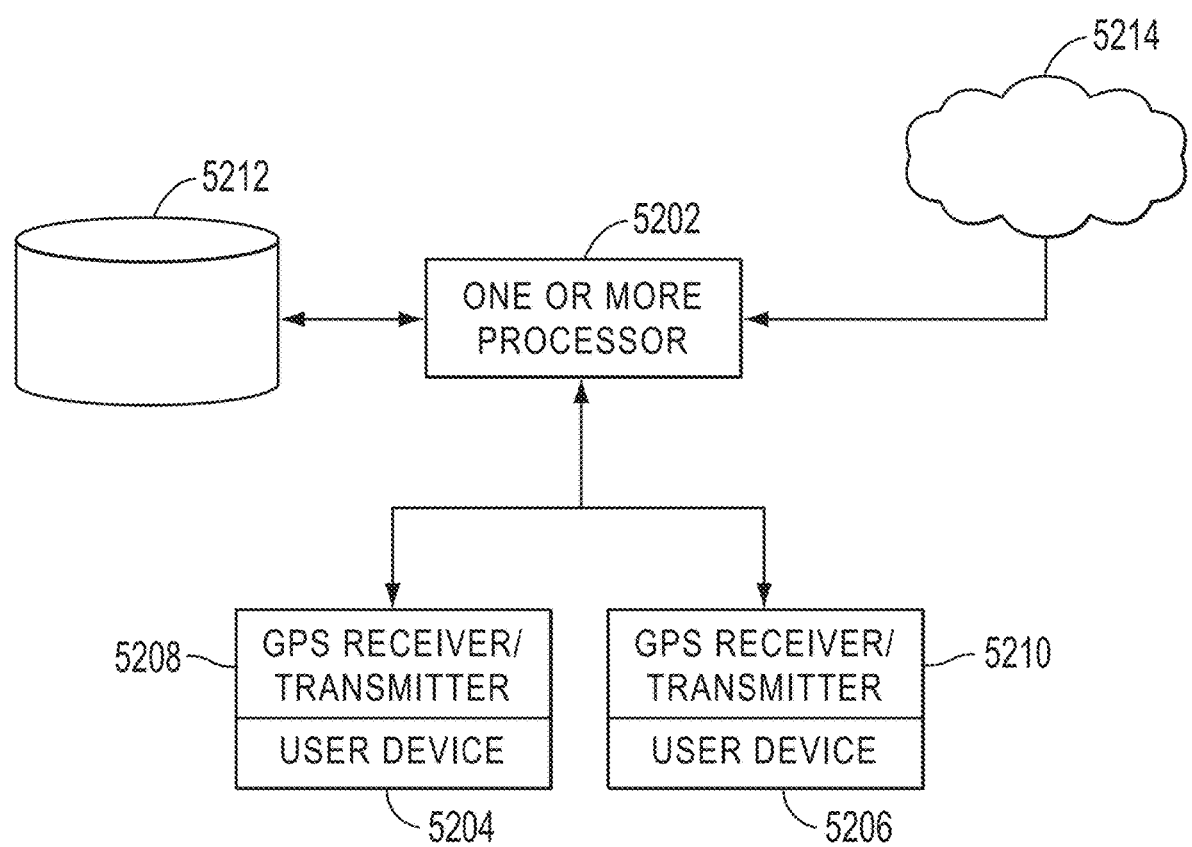
FIG. 8 is a block diagram that illustrates components of a system that is capable of implementing geo-fencing according to the present teachings.

FIG. 8 is a block diagram 5200 that illustrates components that may implement a methodology according to the present teachings. One or more processors 5102 may determine a plurality of geo-fencing areas for one or more users based on monitoring locations of the users, for example, from information associated with the locations detected via one or more user devices (e.g., 5204, 5206) and received from those one or more user devices (e.g., 5204, 5206). For example, one or more user devices may be equipped with or include one or more global position system (GPS) receiver/transmitter (transceiver) devices (e.g., 5208, 5210). The processor may store information associated with one or more geo-fencing areas in a storage device (e.g., 5212).

The processor 5202 may gather content or information associated with the geo-fencing area. Content that is presented may include such information, e.g., biometric, health and information. The information may be gathered from information entered by the user into the system, biometric sensors, and searching an online network 5214, for example, the Internet.

In one embodiment, the content may be presented to one or more user to allow the user(s) to define and modify the content, e.g., via a user interface provided on the one or more processors 5202 or via the user's device.

In one embodiment, the content may be presented to one or more user to allow the user(s) to define and modify the content, e.g., via a user interface provided on the one or more processors 5202 or via the user's device.

System, device and method, according to the present teachings, can employ various biosignal processing technologies for detecting and monitoring a biological stress response to mitigate presence of cognitive dissonance. The system and method can employ biosignal processing technologies, such as medical monitoring devices, including wearable devices, to detect human stress. There are various biosignal processing technologies used for stress detection, for example, such as respiration and skin temperature, blood pressure, blood volume pulses, electroencephalography (EEG), electrocardiography (ECG), electromyography (EMG), and galvanic skin resistance.

For example, FIG. 9 illustrates an example of employing a wearable, portable EEG 6000 to detect a physiological change in the body of a user, such as brain waves and amplifies the EEG signals and records them in a wave pattern 6002, as shown in display screen 6004. The brain waves are the patterns formed by the electrical signals produced by billions of nerve cells in a person's brain.

During the EEG, electrodes 6006 and wires are attached to the user's head. For portability, the EEG device may be a small, wireless, portable device 6008, wherein the components are incorporated within a cap 6010 or a headband. The electrodes 6006 detect the user's brain wave and the EEG device amplifies the brain signal. Algorithms within the EEG device 6000 decode the brain signals the sensors collect. Thus, the EEG device measures and records the electricity activity along the scalp produced by firing of neurons within the brain. Namely, the EEG device measures voltage fluctuations resulting from ionic current flows within the neurons of the brain.

The EEG device 6000 is used to capture the brain signal in order to detect stress. The user's stress level can be detected and quantified through EEG monitoring. After detecting the stress using the EEG signals, the device attempts to reduce and mitigate the stress level by applying a stimulatory effect to the user.

Due to the portability of the device, the system and method is capable of measuring brain activity and other biometrics conditions, such as heart rate, as the user enters and exists predefined geofence locations. The system and method are capable of monitoring and detecting stress levels indicative of, for example, for mental health purposes, changes in the user's state of mind that might indicate stress, such as anxiety or depression.

Various embodiments of the system, device and method can be used to implement biofeedback, neurofeedback, or the combination thereof. Biofeedback can be used as a training tool that measures physiological changes associated with how the user is feeling, thinking and behaving. By feeding the biofeedback information back into the system in real time, biofeedback creates a context for learning to regulate the user's own body processes, and thereby influence the user's ability to adapt to stressful situations or crises.

Neurofeedback is a special form of biofeedback. Neurofeedback works specifically with measures of brain activity. Neurofeedback is based on the EEG measurements of the brain waves, as discussed above. Neurofeedback is a form of brain training that works directly at the physiological level. Neurofeedback produces changes in mental and emotional functioning by training changes in the EEG. As the EEG 6000 detects the user's brain waves, a neurofeedback software application analyzes the EEG signals and provides real-time feedback to the user's brain so that the brain learns. The feedback functions as a reward signal. With repeated experience of the feedback, the brain learns the proper response needed for the desired parameter. In psychological terms, this is a process of conditioning. In neurofeedback, the brain learns. With the combination of neurofeedback and biofeedback, specific skills, e.g. attention control, can be trained and developed.

Biofeedback is training at the level of the mind, and neurofeedback is training at the level of the brain. Further exemplary embodiments are described wherein biofeedback and neurofeedback may be used in combination with each other or may be used alone in the system to mitigate the manifestation of cognitive dissonance within a user. Initially, the device can be used to obtain and record baseline biometrics, specific goals and desired outcome of using the cognitive dissonance mitigation program. The program can be used solely by the user or with the assistance of another person, such as a therapist, medical professional or counselor. The collected biometric signals can be used to assist in quantifying cognitive dissonance. When a conflicting thought process, attitude, or behavior is detected by the device through monitoring and measuring of stress levels, biofeedback or neurofeedback, the device alerts the user of the conflict. The feedback mechanism can include, for example, wearable devices, brain machine interface (BMI), phone application, computer software, etc.

Figure 10:
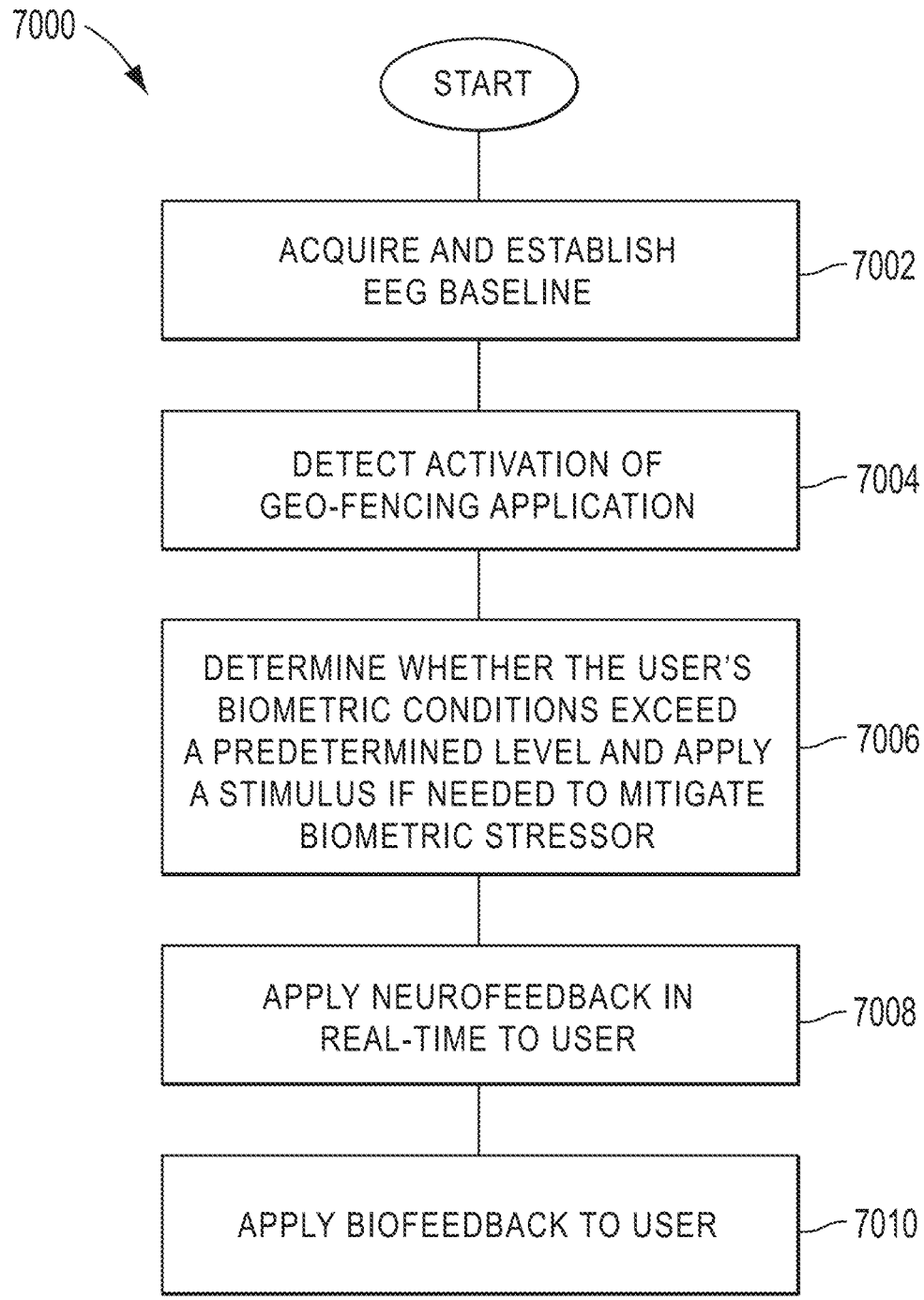
FIG. 10 is a flow diagram illustrating the operations of the electroencephalogram apparatus according to the present teachings.

The operation of the EEG process 7000 will be described in FIG. 10. FIG. 10 is a flowchart showing the operation of the EEG for mitigating cognitive dissonance. At Step 7002, the system acquires an EEG from the user and establish a baseline. The system, using the EEG device 600, records electrical activity of the user's brain utilizing a wireless connection and dry electrodes to determine a baseline EEG reading for the user. At Step 7004, the system detects the activation of the geo-fencing application, as described above. At Step 7006, the system determines whether the user's biometric conditions exceed a predetermined level and apply a stimulus if needed to mitigate biometric stressor. At Step 7008, the system determines whether to apply in real-time a neurofeedback. At Step 7010, the system determines whether to apply a biofeedback to the user.

The system, device and method can monitor one or more behavioral attributes of an individual. Some examples of a behavioral attribute may include at least one of a mental health, physical health, medical, educational, addictions, decision making, sleep disorder, and goal attainment. An example of a mental health may include, for example, an anxiety disorder wherein the user out of worry or fear suffers an anxiety attack. A medical example may include the detection of symptoms of an illness or a disease, for example, COVID-19. A physical health example may include the detection of weight loss parameters for a person who wants to improve or maintain their fitness by beginning a fitness routine. An educational example may include detecting stress associated with brain activity or monitoring habits for a person who wants to improve their grades. An addiction example is monitoring and detecting biometrics, physical measurements and brain activity of a person with an alcoholic addiction, who is attempting to recover and maintain sobriety. A decision-making example is monitoring and detecting a person's brain activity while conducting a financial transaction. An example of a sleep disorder includes detection and monitoring physical measurements and brain activity of a person suffering from, for example, sleep apnea, insomnia, hypersomnia, parasomnia, and circadian rhythm. A goal attainment example is monitoring and cognitive capability and physical measurements to detect deleterious habits and changing the habit to assist a person to obtain a specific goal.

The system and method can detect the various biometrics described in the above examples by measuring, for example, at least one of perspiration levels, heart rate level, cortisol levels, saliva test, pulse oximeter, sweat level via polygraph, blood pressure via sphygmomanometer, fMRI, body mass index, body temperature, blood sugar levels, blood alcohol via a breathalyzer, body mass index, weight, According to the present invention, the wearable device can detect the biometric changes as the user approaches, enters or exists a location defined by the geofencing. A feedback mechanism can provide feedback to the user, the system or a combination of both. The feedback can be provided dynamically to the user, for example, with neurofeedback to facilitate instantaneous brain learning. When the detected stress exceeds a predetermined threshold, a stimulatory effect is applied to the user to mitigate the stress. The feedback can also be provided and stored within the system so that associated software can generate reports and formulate prediction estimates of potential outcomes associated with the detected behavior based on scientific evidence. The report may summarize, for example, that prolonged stress leads to poor heart health or neurodegeneration. The report can provide proactive tips on how to mitigate the possible deleterious effects and create a plan for continual success in mitigating the behavior. The report can be presented to the user digitally on an electronic display or in a printout format.

Other embodiments of the invention will be apparent to those skilled in the art from consideration of the specification and practice of the invention disclosed herein. For instance, the cognitive dissonance mitigation rules database may be packaged and sold for use by users as software programmed on a computer disc, via the Internet or as course instructional software to support an online course or a printed textbook. According to another example, the biometric device may include a built-in scanner for performing a preauthorization, for example, during a financial transaction at a retail store, before the user is permitted to finalize a financial transaction at a point-of-sale. The built-in scanner is capable of remotely linking to the system to preauthorize a transaction with one or more credit cards. The user cannot use the credit card to make a purchase or conduct a transaction for a particular product if the product is not initially scanned for preauthorization by the scanner prior to the purchase. When the transaction exceeds a predetermined amount or is unauthorized, the system sends an alert to another person, such as a parent or guardian, who has the authority to authorize the purchase. This enables the parent or guardian to dynamically control, for example, a child's purchase. This will also circumvent the parent's need to dispute an unauthorized charge by a child after the transaction has been made.

It is intended that the specification and examples be considered as exemplary only, with a true scope and spirit of the invention being indicated by the following claims.

What is claimed is:

1. A wearable biometric device to reduce cognitive dissonance, comprising:
   an interactive user interface with a display that receives information from a user;
   a location unit configured to determine a location information of the wearable biometric device;
   one or more biometric sensors positioned in contact with a user's body and configured to detect one or more biometric signals indicative of one or more biometric conditions sensed from the user's body;
   a stimuli generating unit configured to provide one or more stimuli to the user based on the one or more biometric signals detected by the one or more biometric sensors;
   an embedded transceiver configured to receive and transmit signals including data, information and command and control signals received via wireless signals to and from a remote server communicatively coupled to the wearable biometric device;
   a processor in communication with the embedded transceiver and configured for processing the signals including the data, the information, and the command and the control signals, wherein the processor is operatively coupled to the interactive user interface, the location unit, the one or more biometric sensors, and the stimuli generating unit;
   the interactive user interface, the location unit, the one or more biometric sensors, and the stimuli generating unit, all of which are embedded in the wearable biometric device;
   a memory configured to store instructions executable by the processor, wherein:
   the location unit, through the use of GPS and geographical mapping information, determines a current location of the wearable biometric device;
   a geo-fence application, running on the wearable biometric device, defines, based on the current location information, one or more geo-fences having a virtual boundary relative to one or more respective physical locations;
   the location unit detects a geo-fence crossing when the wearable biometric device crosses any of the one or more geo-fences;
   the geo-fence application defines, based on the current location information, at least one of a type of geo-fence event, a type of geo-fence transition, and a type of predefined geofence trigger event;
   the embedded transceiver receives, from the remote server, user data of the user based on the at least one of the type of geo-fence event, the type of geo-fence transition, and the type of predefined geofence trigger event;
   the embedded transceiver receives, from the remote server, user transaction data, wherein the remote server monitors user transactions conducted by the user and transmits to the embedded transceiver the user transaction data representing the user transactions while the wearable biometric device is located within the geo-fence;
   when the geo-fence application is active, the one or more biometric sensors, based on the contact with the user's body, dynamically detect and analyze the one or more biometric conditions of the user to determine if one or more biometric condition signal levels representing the one or more biometric conditions of the user exceed a predetermined threshold while the wearable biometric device is located within the geo-fence;
   when the one or more biometric condition signal levels exceed the predetermined threshold, the one or more biometric sensors in contact with the user's body dynamically detect and analyze one or more biometric stressor signal levels representing one or more physical characteristics in the user's body to determine if the user experiences a biometric stressor while the wearable biometric device is located within the geo-fence;

the stimuli generating unit, in response to the detection of the biometric stressor, applies one or more stimuli directly to the user's body such that the one or more stimuli is physically sensed by the user to cause the one or more physical characteristics to undergo one or more physical changes in the user's body in response to the applied one or more stimuli, until the one or more detected biometric stressor signal levels is below the predetermined threshold;

a neurofeedback unit including:
electrode sensors in contact with the user's body for capturing, recording and transmitting brain signals of electroencephalographic brain activity of a brain of the user;
a neurofeedback portable device for receiving, processing and decoding the brain signals to generate neurofeedback data of the electroencephalographic brain activity and displaying the neurofeedback data of the electroencephalographic brain activity; and
the neurofeedback portable device configured to provide neurofeedback in real-time to the brain of the user via the electrode sensors to train the brain and reduce the one or more biometric stressor signal levels;

the interactive user interface dynamically displays interactive content on the wearable biometric device, wherein the interactive content includes at least one of:
(a) biometric information including at least one of the one or more detected biometric conditions, the one or more detected biometric stressors, and the one or more stimuli being applied to the user;
(b) the detected location information;
(c) a graphical representation of geo-fencing information, including at least a geo-fencing defined area on a map;
(d) the user data; and
(e) the neurofeedback data;

an embedded button on the wearable biometric device, which is operatively coupled to the processor, or the interactive user interface enables the user to selectively modify one or more of the interactive content; and the location unit in conjunction with the geo-fence application deactivate the one or more geo-fences relative to the one or more physical locations when the wearable biometric device exits the one or more geo-fences.

2. The device of claim 1, wherein the stimuli generating unit is located on an inner side of a band of the wearable biometric device to apply the one or more stimuli directly to a user's skin.

3. The device of claim 1, wherein the stimuli generating unit is not in contact with a user's skin.

4. The device of claim 1, wherein the biometric sensor includes at least one of a perspiration sensor, a body temperature sensor, a pH sensor, a blood pressure sensor, a blood sugar level, a pulse rate sensor, a blood oxygen sensor, an infrared sensor, a thermal probe, a mechanical pressure probe, and a smart clothing.

5. The device of claim 1, wherein the biometric sensor is configured to monitor, detect and collect the biometric information regarding at least one of biometric data, physiological data and environmental data.

6. The device of claim 1, wherein the one or more biometric conditions of the user comprises at least one of a perspiration level, a perspiration content, a skin temperature, a body temperature, a blood pressure, a blood glucose, a heart rate, a pH level, and a hydration level.

7. The device of claim 1, wherein the processor, using the embedded transceiver, sends an alert signal transmitted to the wearable biometric device to provide a notification to notify the user of the biometric stressor.

8. The device of claim 1, wherein the processor, using the embedded transceiver, sends a notification alert of the biometric stressor to at least one of the user and a third-party.

9. The device of claim 1, wherein the one or more stimuli applied to the user includes at least one of an auditory stimuli, a tactile stimuli, a vibratory stimuli, a pressure stimuli, a temperature stimuli, a visual stimuli, and a speech stimuli.

10. The device of claim 1, wherein the user data comprises behavior data and the user transaction data comprise behavior transaction data, and
wherein the processor is further configured to perform a comparative analysis to determine whether the behavior transactions conducted by the user while located within the geo-fence is consistent with behavior planning information of the user.

11. The device of claim 10, wherein the behavior planning information of the user comprises at least one of values, vision, life goals, priorities and planned intentions defined by the user during behavior planning.

12. The device of claim 1, wherein the current location comprises at least one of a business location, a retail location, an educational facility, and a medical facility.

13. The device of claim 1, wherein the neurofeedback unit is a wireless, portable device.

14. The device of claim 1, wherein the electrode sensors are included within a cap or a headband, which is worn on a head of the user.

15. The device of claim 1, wherein the neurofeedback unit is configured to display brain wave patterns on a display screen of the neurofeedback portable device.

16. A wearable biometric device to reduce cognitive dissonance, comprising:
an interactive user interface with a display that receives information from a user;
a location unit configured to determine a location information of the wearable biometric device;
one or more biometric sensors positioned in contact with a user's body and configured to detect one or more biometric signals indicative of one or more biometric conditions sensed from the user's body;
an embedded transceiver configured to receive and transmit signals including data, information and command and control signals received via wireless signals to and from a remote server communicatively coupled to the wearable biometric device;
a processor in communication with the embedded transceiver and configured for processing the signals including the data, the information, and the command and the control signals, wherein the processor is operatively coupled to the interactive user interface, the location unit, and the one or more biometric sensors;
the interactive user interface, the location unit, and the one or more biometric sensors, all of which are embedded in the wearable biometric device;

a memory configured to store instructions executable by the processor, wherein:
  the location unit, through the use of GPS and geographical mapping information, determines a current location of the wearable biometric device;
  a geo-fence application, running on the wearable biometric device, defines, based on the current location information, one or more geo-fences having a virtual boundary relative to one or more respective physical locations;
  the location unit detects a geo-fence crossing when the wearable biometric device crosses any of the one or more geo-fences;
  the geo-fence application defines, based on the current location information, at least one of a type of geo-fence event, a type of geo-fence transition, and a type of predefined geofence trigger event;
  the embedded transceiver receives, from the remote server, user data of the user based on the at least one of the type of geo-fence event, the type of geo-fence transition, and the type of predefined geofence trigger event;
  the embedded transceiver receives, from the remote server, user transaction data, wherein the remote server monitors user transactions conducted by the user and transmits to the embedded transceiver the user transaction data representing the user transactions while the wearable biometric device is located within the geo-fence;
  when the geo-fence application is active, the one or more biometric sensors, based on the contact with the user's body, dynamically detect and analyze the one or more biometric conditions of the user to determine if one or more biometric condition signal levels representing the one or more biometric conditions of the user exceed a predetermined threshold while the wearable biometric device is located within the geo-fence;
  when the one or more biometric condition signal levels exceed the predetermined threshold, the one or more biometric sensors in contact with the user's body dynamically detect and analyze one or more biometric stressor signal levels representing one or more physical characteristics in the user's body to determine if the user experiences a biometric stressor while the wearable biometric device is located within the geo-fence;
  a neurofeedback unit including:
    electrode sensors in contact with the user's body for capturing, recording and transmitting brain signals of electroencephalographic brain activity of a brain of the user;
    a neurofeedback portable device for receiving, processing and decoding the brain signals to generate neurofeedback data of the electroencephalographic brain activity and displaying the neurofeedback data of the electroencephalographic brain activity; and
    the neurofeedback portable device configured to provide neurofeedback in real-time to the brain of the user via the electrode sensors to train the brain and reduce the one or more biometric stressor signal levels;
  the interactive user interface dynamically displays interactive content on the wearable biometric device, wherein the interactive content includes at least one of:
    (a) biometric information including at least one of the one or more detected biometric conditions, and the one or more detected biometric stressors;
    (b) the detected location information;
    (c) a graphical representation of geo-fencing information, including at least a geo-fencing defined area on a map;
    (d) the user data; and
    (e) the neurofeedback data;
  an embedded button on the wearable biometric device, which is operatively coupled to the processor, or the interactive user interface enables the user to selectively modify one or more of the interactive content; and
  the location unit in conjunction with the geo-fence application deactivate the one or more geo-fences relative to the one or more physical locations when the wearable biometric device exits the one or more geo-fences.

17. The device of claim 16, wherein the neurofeedback unit detects the brain signals to analyze the one or more biometric stressor signal levels.

18. The device of claim 17, wherein the neurofeedback unit is a wireless, portable device.

19. The device of claim 17, wherein the neurofeedback unit is configured to display brain wave patterns on a display screen of the neurofeedback portable device.

20. The device of claim 17, wherein the current location comprises at least one of a business location, a retail location, an educational facility, and a medical facility;
  wherein the user data comprises behavior data and the user transaction data comprise behavior transaction data, and
  wherein the processor is further configured to perform a comparative analysis to determine whether the behavior transactions conducted by the user while located within the geo-fence is consistent with behavior planning information of the user.

21. The device of claim 17, wherein the electrode sensors are included within a cap or a headband, which is worn on a head of the user.

* * * * *